United States Patent
Vetere, II

(10) Patent No.: US 10,843,606 B2
(45) Date of Patent: Nov. 24, 2020

(54) HEAD RESTRAINT MECHANISM FOR REVERSIBLE SEAT

(71) Applicant: Magna Seating Inc, Aurora (CA)

(72) Inventor: Louis Vetere, II, Commerce Township, MI (US)

(73) Assignee: Magna Seating Inc, Aurora (CA)

( * ) Notice: Subject to any disclaimer, the term of this patent is extended or adjusted under 35 U.S.C. 154(b) by 83 days.

(21) Appl. No.: 16/191,522

(22) Filed: Nov. 15, 2018

(65) Prior Publication Data

US 2019/0143866 A1 May 16, 2019

Related U.S. Application Data

(60) Provisional application No. 62/587,001, filed on Nov. 16, 2017.

(51) Int. Cl.
| | | |
|---|---|---|
| *B60N 2/80* | (2018.01) | |
| *B60N 2/844* | (2018.01) | |
| *B60N 2/853* | (2018.01) | |
| *B60N 2/806* | (2018.01) | |
| *B60N 2/20* | (2006.01) | |
| *B60N 2/14* | (2006.01) | |
| *B60N 2/90* | (2018.01) | |

(52) U.S. Cl.
CPC ............. *B60N 2/844* (2018.02); *B60N 2/203* (2013.01); *B60N 2/806* (2018.02); *B60N 2/853* (2018.02); *B60N 2/143* (2013.01); *B60N 2002/948* (2018.02)

(58) Field of Classification Search
CPC ........ B60N 2/844; B60N 2/806; B60N 2/853; B60N 2/203; B60N 2/143; B60N 2/80; B60N 2/856; B60N 2002/948
USPC .......................................................... 297/408
See application file for complete search history.

(56) References Cited

U.S. PATENT DOCUMENTS

| | | | | |
|---|---|---|---|---|
| 6,962,392 | B2 * | 11/2005 | O'Connor | A47C 7/38 |
| | | | | 297/61 |
| 7,484,795 | B2 * | 2/2009 | Saint-Jalmes | A47C 7/48 |
| | | | | 297/130 |
| 7,753,452 | B2 | 7/2010 | Suzuki et al. | |
| 8,197,007 | B2 | 6/2012 | Lutzka et al. | |
| 9,061,615 | B2 | 6/2015 | Wang et al. | |
| 9,145,078 | B2 * | 9/2015 | Locke | B60N 2/0232 |
| 9,475,415 | B2 | 10/2016 | Grable | |
| 2005/0242640 | A1 | 11/2005 | Barko et al. | |
| 2005/0253433 | A1 * | 11/2005 | Brown | B60N 2/3011 |
| | | | | 297/283.3 |
| 2011/0084534 | A1 | 4/2011 | Sohn | |
| 2019/0152369 | A1 * | 5/2019 | Zhao | B60N 2/856 |
| 2019/0283640 | A1 * | 9/2019 | Vetere, II | B60N 2/767 |

* cited by examiner

*Primary Examiner* — Mark R Wendell
(74) *Attorney, Agent, or Firm* — Miller Canfield

(57) ABSTRACT

A reversible seat for an automotive vehicle having a head restraint which rotates between a forward-facing position and a rearward-facing position as the seat is moved between the forward-facing position and the rearward-facing position. The head restraint folds towards the seat back as the reversible seat passes through the peak of its locus to increase clearance with a headliner of the automotive vehicle. The head restraint returns to an upright rotated position as the seat reaches the opposing position.

18 Claims, 19 Drawing Sheets

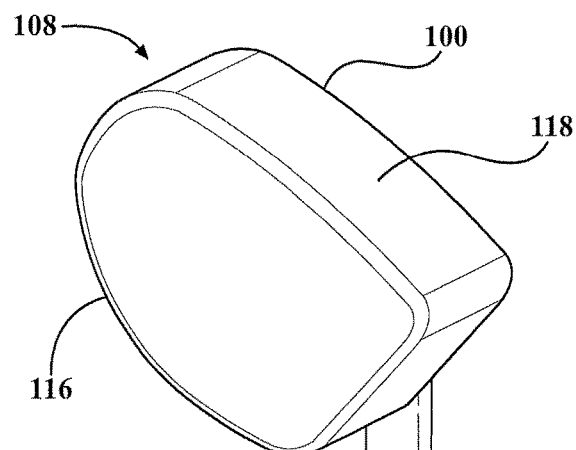
FIG. 3D
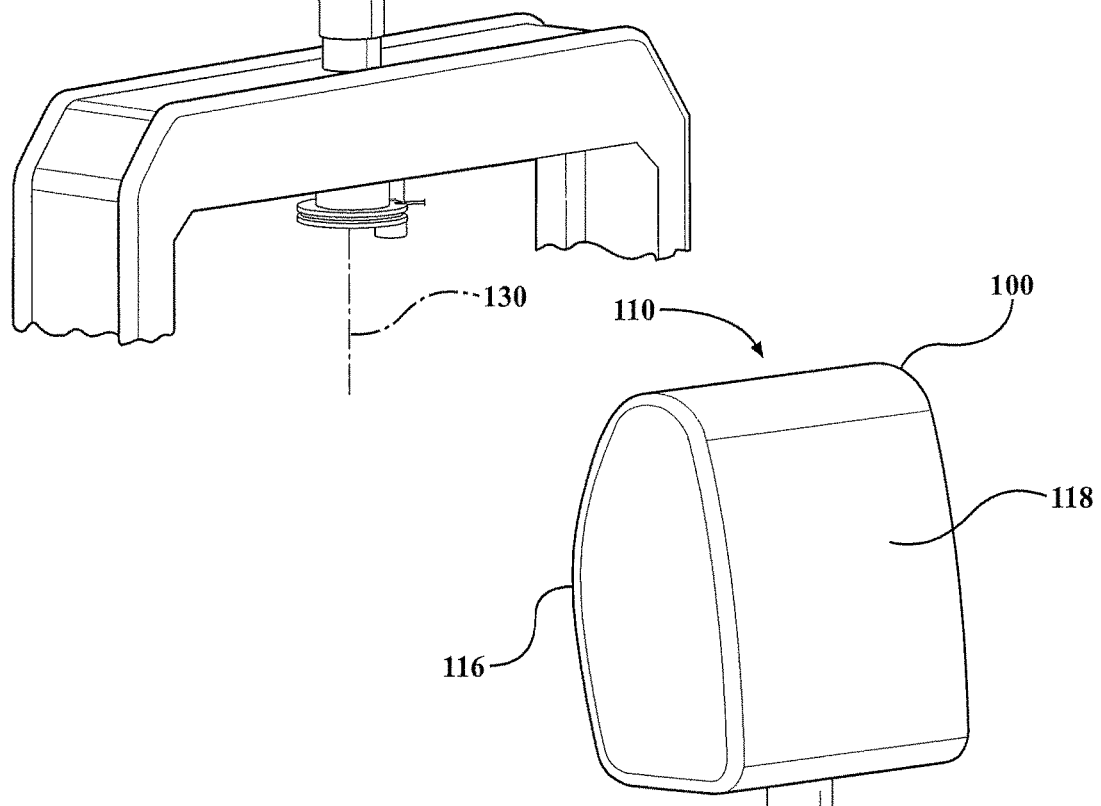
FIG. 3E
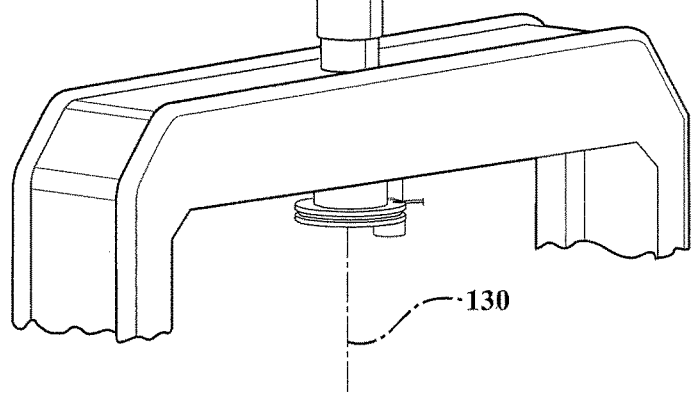

HEAD RESTRAINT MECHANISM FOR REVERSIBLE SEAT

CROSS-REFERENCE TO RELATED APPLICATIONS

This application claims priority to U.S. Provisional Application No. 62/587,001, filed on Nov. 16, 2017.

BACKGROUND OF THE INVENTION

1. Field of the Invention

The present invention relates to a head restraint for a reversible automotive seat. More particularly, the invention relates to a head restraint which rotates and folds flat and then returns to an upright position while the seat is moved between a forward-facing and a rearward-facing position.

2. Description of Related Art

Various head restraint adjustment systems integrated into automotive seats are known in the art. One known system changes an inclination angle of a reversible head restraint as the reversible seat is moved between a forward-facing and a rearward-facing position.

Other generally known vehicle seats have head restraints which are folded down when a seat back is placed in a folded flat position. Some generally known head restraints may comprise mechanisms for adjusting the height and/or inclination of a head restraint on a vehicle seat back. Other known head restraints may be configured to be removable from the seat back prior to folding the seat back into a fold down position.

However, all of these examples may result in the head restraint contacting a headliner in a vehicle when a reversible seat is moved between opposing positions. One alternative may be to reduce the overall height of a seat back and/or head restraint in order to provide clearance with the headliner during the seat reversing process. A reduced height may result in a seat which does not maintain compliance with the Federal Motor Vehicle Safety Standards (FMVSS) 202A height requirements. Further, if the orientation of a head restraint is maintained when the seat back is moved between a forward-facing and a rearward-facing position, then both sides of the head restraint must be suitable for use by an occupant of the seat. Having to use both sides of the head restraint by the occupant may increase cost and/or complexity of the head restraint.

It is desirable, therefore, to improve head restraint clearance with the headliner during the seat reversal process. It is also desirable to meet FMVSS 202A height requirements when the seat is in both the forward-facing and rearward-facing positions. Further, it is desirable to have a single surface of the head restraint oriented towards the occupant when the seat is in both positions. Finally, it is desirable to have a head restraint which moves to the rearward-facing position automatically based on the movement of the seat back between the two opposing positions.

SUMMARY OF THE INVENTION

A reversible seat for an automotive vehicle has a head restraint which rotates between a forward-facing position and a rearward-facing position as the seat is moved between the forward-facing position and the rearward-facing position. The head restraint folds towards the seat back as the reversible seat passes through the peak of its locus to increase clearance with a headliner of the automotive vehicle. The head restraint returns to an upright rotated position as the seat reaches the opposing position.

BRIEF DESCRIPTION OF THE DRAWINGS

Advantages of the present invention will be readily appreciated as the same becomes better understood by reference to the following detailed description when considered in connection with the accompanying drawings wherein:

FIG. 3D illustrates a side perspective view of a head restraint in a second transition position according to one embodiment of the present invention;

FIG. 3E illustrates a side perspective view of a head restraint in a rearward-facing position according to one embodiment of the present invention;

DETAILED DESCRIPTION OF THE EMBODIMENTS

FIGS. 1 to 16 illustrate a reversible head restraint for an automotive seat according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, cross section views of automotive head restraint assemblies are shown to illustrate their layers and components, but such views are not necessarily to scale. Referring to the Figures, like numerals indicate like or corresponding parts throughout the several views.

Figure 1:
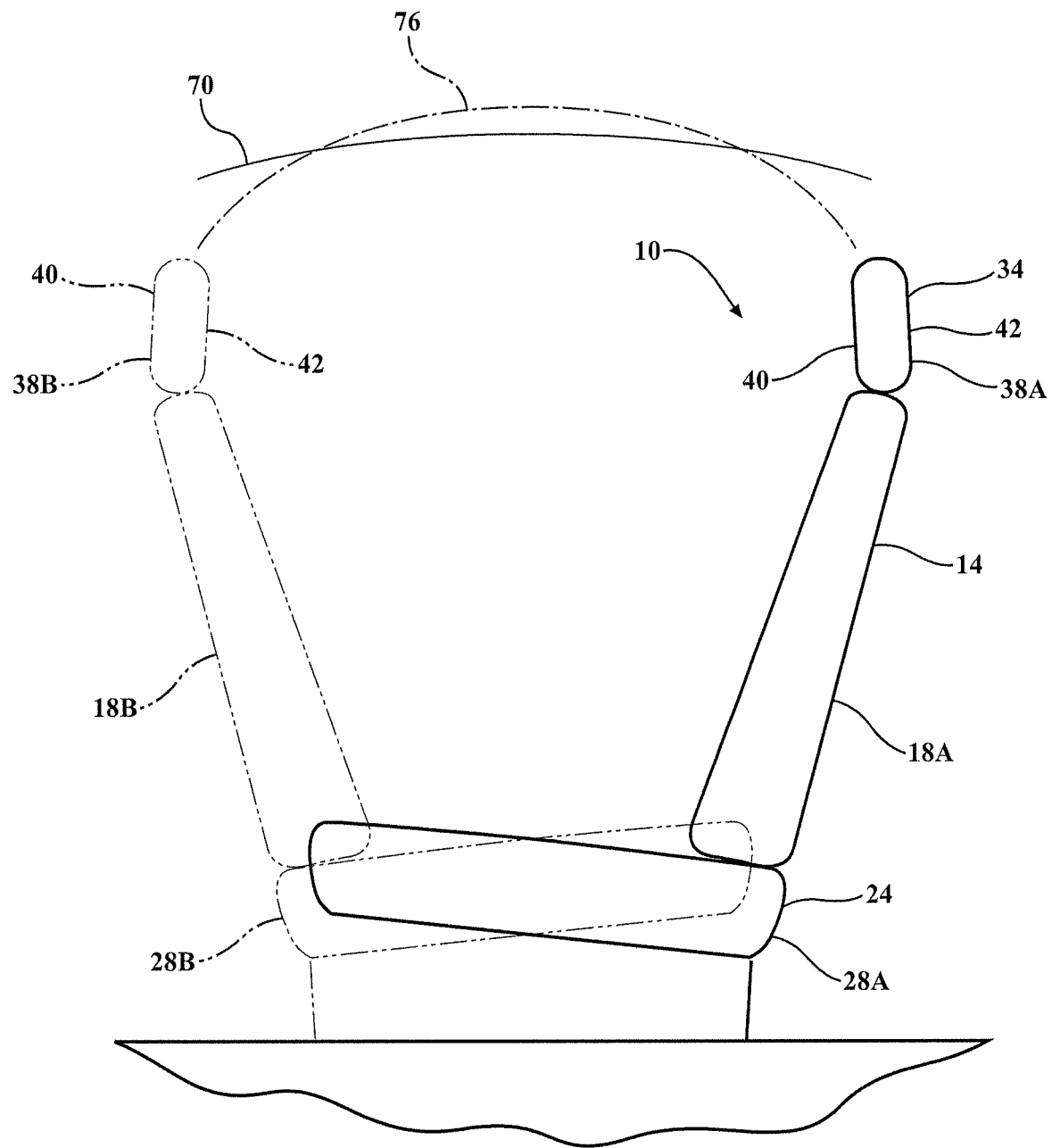
FIG. 1 illustrates a side view of a reversible seat for an automotive vehicle in a forward-facing upright position and a rearward-facing upright position.

FIG. 1 illustrates a side view of a reversible seat 10 for an automotive vehicle (not shown) having a seat back 14 that moves from a forward-facing upright position 18A to a rearward-facing upright position 18B, as generally known in the art. The reversible seat 10 has a seat cushion 24 and a head restraint 34 that may automatically tilt to an appropriate inclination angle between a forward-facing position 28A, 38A and a rearward-facing position 28B, 38B, respectively. The head restraint 34 shown in FIG. 1 is generally symmetrical with a first side 40 having a profile similar to a second side 42. This permits both the first side 40 and the second side 42 to be used by an occupant of the seat 10 depending if the seat back 14 is in the forward-facing upright position 18A or the rearward-facing upright position 18B.

Figure 2A:
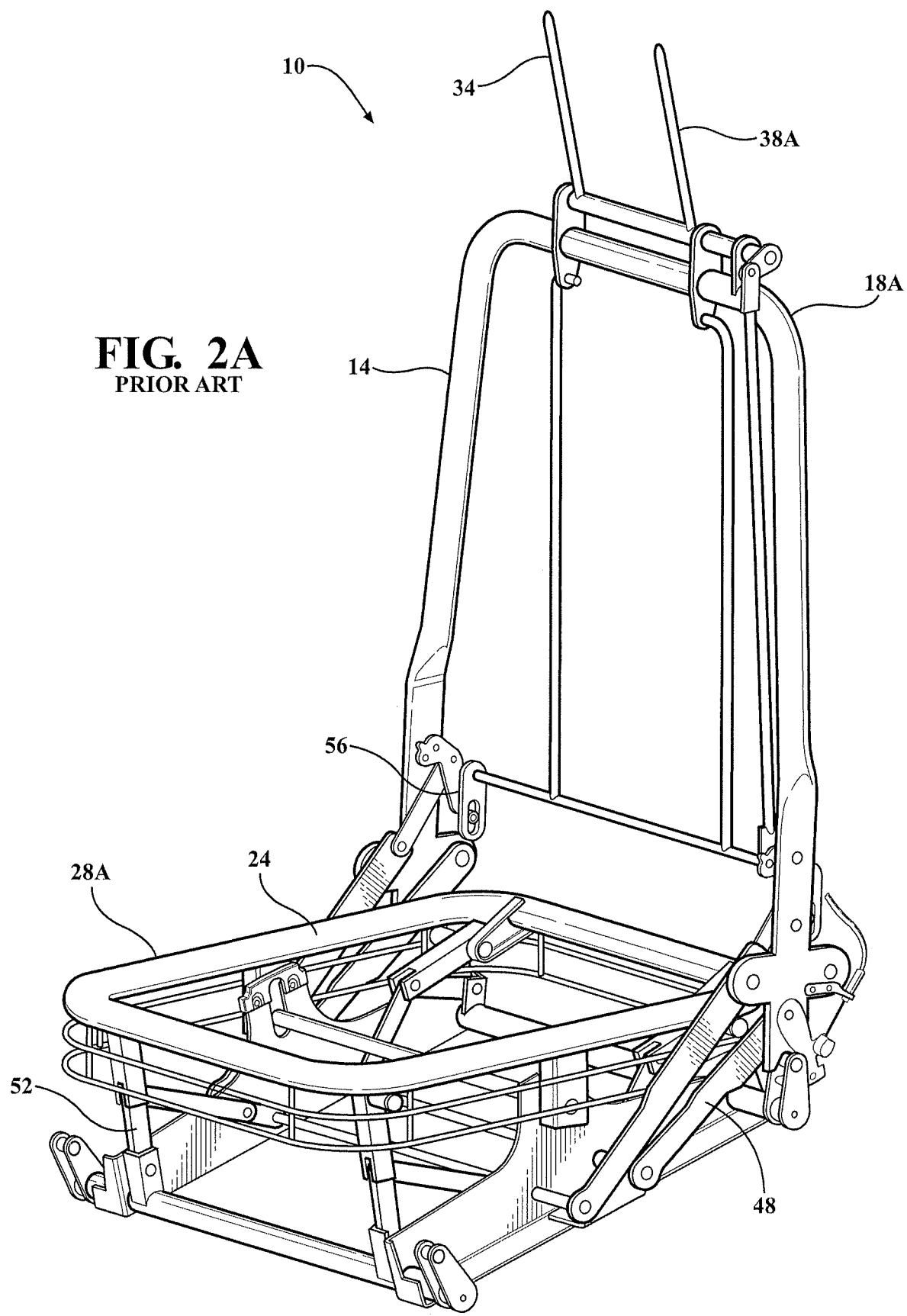
FIG. 2A illustrates a side perspective view of a generally known reversible seat in a forward-facing position.
Figure 2B:
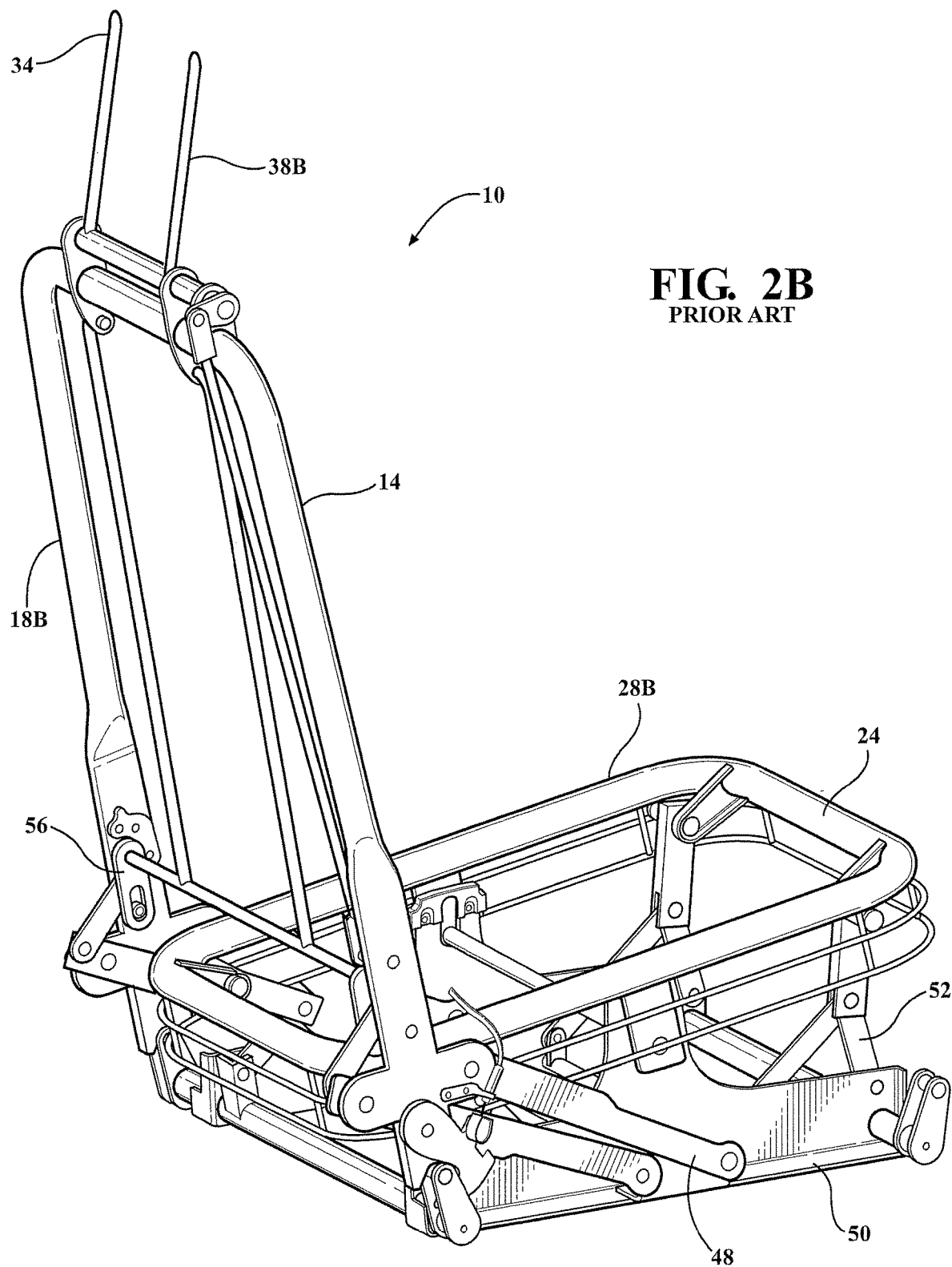
FIG. 2B illustrates a side perspective view of a generally known reversible seat in a rearward-facing position.

FIGS. 2A and 2B show a side perspective view of a generally known reversible seat 10 in the forward-facing position and the rearward-facing position, respectively. The reversible seat 10 comprises a seat back frame 14, a seat cushion frame 24, a head restraint frame 34, a seat back reversing linkage 48 operatively connected between the seat back frame 14 and a seat base 50, a seat cushion inclination linkage 52 operatively coupled between the seat back reversing linkage 48 and the seat cushion frame 24, and a head restraint inclination linkage 56 operatively coupled between the seat back reversing linkage 48 and the head restraint frame 34. As is generally known in the art, the seat 10 comprises linkages 48, 52, 56 that control the seat back 14, seat cushion 24, and head restraint 34 motions between the forward-facing position (FIG. 2A) and the rearward-facing position (FIG. 2B). Movement of the seat back 14 between the forward-facing upright position 18A and the rearward-facing upright position 18B repositions the seat back reversing linkage 48 which repositions the seat cushion linkage 52 to change the inclination of the seat cushion 24. Movement of the seatback linkage 48 also repositions the head restraint linkage 56 which changes the inclination of the head restraint 34. Examples of generally known reversible seats are described in Applicant's U.S. patent application Ser. No. 12/092,718, filed Nov. 16, 2006, now U.S. Pat. No. 7,644,982; and U.S. patent application Ser. No. 10/239,538, filed Mar. 22, 2001, now U.S. Pat. No. 6,715,825, the disclosures of which are incorporated by reference herein in their entireties.

During a reversing motion, the head restraint 34 for the seat 10 needs to clear the vehicle headliner 70. As shown in FIG. 1, the head restraint 34 moves between the forward-facing position 38A and the rearward-facing position 38B along a path 76. Depending on the dimensions of the seat 10 and the position of the headliner 70, the seat 10 and/or the head restraint 34 may contact the headliner 70 when the seat back 14 is reversed. Reducing the height of the seat 10 and/or head restraint 34 may not be desirable because the seat 10 must meet Federal Motor Vehicle Safety Standards (FMVSS) 202A height requirements. Some types of seats are known to have a removable head restraint. However, a removable head restraint may inconvenience an occupant and may reduce occupant comfort due to the head restraint being removable. Other seats may have a folding and/or tilting head restraint which changes position during a seat reversing motion. This requires both the forward-facing side and the rearward-facing side of the head restraint to be usable by an occupant of the seat which may increase the cost of the head restraint and/or may reduce occupant comfort.

A novel head restraint for a reversible seat according to the present invention comprises head restraint folding and rotating mechanisms to fold the head restraint towards a top portion of the seat back while the head restraint is being rotated between a forward-facing position and a rearward-facing position. Folding the head restraint towards the seat back increases clearance with the headliner as the seat is reversed. Rotating the head restraint between the forward-facing and rearward-facing positions allows for a unidirectional head restraint, i.e., one head restraint surface is used by an occupant of a seat regardless of the directional orientation of the seat. Further, reversing the head restraint allows the seat to meet Federal Motor Vehicle Safety Standards (FMVSS) 202A height requirements in both the forward and rearward facing seating positions.

Figure 3A:
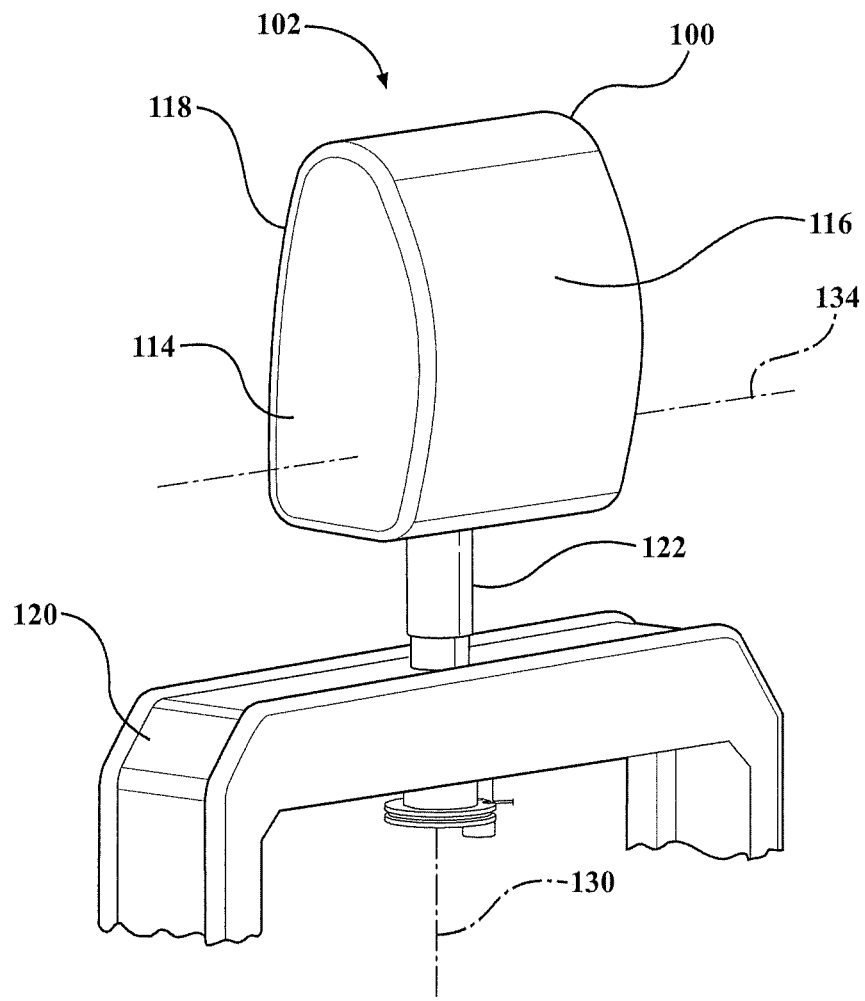
FIG. 3A illustrates a side perspective view of a head restraint in a forward-facing position according to one embodiment of the present invention.

FIGS. 3A-3E illustrate side perspective views of a head restraint 100, according to one embodiment of the present invention, as the head restraint 100 moves between a forward-facing design position 102 (FIG. 3A), a first transition position 104 (FIG. 3B), a fold flat position 106 (FIG. 3C), a second transition position 108 (FIG. 3D), and a rearward-facing design position 110 (FIG. 3E).

The phrases "fold flat position" and "folded position" represent a head restraint which rotates towards the seat back. The angle of inclination of the head restraint in the folded position, i.e. the fold flat position, may be any angle suitable for an intended application. For example, a head restraint that is folded flat may be folded (rotated) at an angle of 90 degrees, less than 90 degrees, or more than 90 degrees towards the upper surface of the seat back.

As shown in FIG. 3A, a reversing head restraint 100, according to an embodiment of the present invention, comprises a head restraint body 114 having a front surface 116 and a rear surface 118. The head restraint 100 (also abbreviated as H/R) is supported above a seat back 120 by a shaft 122. The head restraint 100 rotates about a head restraint rotational axis (H/R rotational axis) 130 and folds about a head restraint folding axis (H/R folding axis) 134. As shown in FIG. 3A, in the forward-facing design position 102, the front surface 116 of the head restraint 100 is facing forward and the head restraint 100 is in a generally upright position. The generally upright position may align with a vertical direction with respect to ground, may align with a longitudinal direction of the H/R rotational axis, and/or may be inclined at an angle.

Figure 3B:
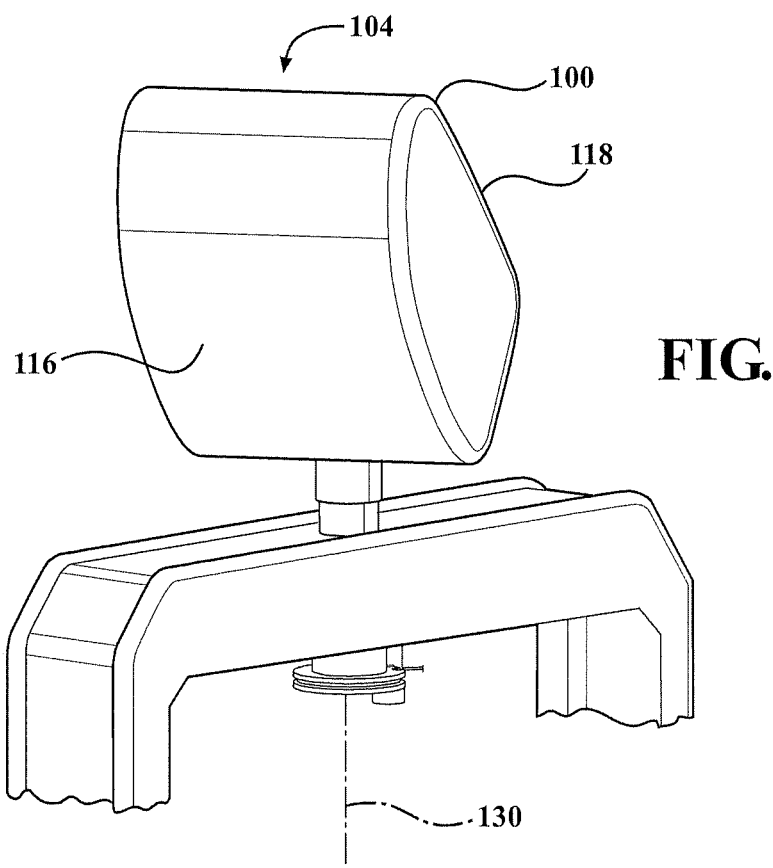
FIG. 3B illustrates a side perspective view of a head restraint in a first transition position according to one embodiment of the present invention.

When the head restraint 100 is reversed towards the rearward-facing design position 110 (FIG. 3E), the head restraint 100 is repositioned into the first transition position 104 (FIG. 3B) where the head restraint 100 is partially rotated about the rotational axis 130 and partially pivoted about the folding axis 134 towards the fold flat position 106. As shown in FIG. 3B, the first transition position 104 may be about 45 degree rotation of the head restraint 100 about the H/R rotational axis 130 and about 45 degree rotation about the H/R folding axis 134. However, any angles of rotation about the H/R rotational axis 130 and about the H/R folding axis 134 suitable for an intended application may be used.

Figure 3C:
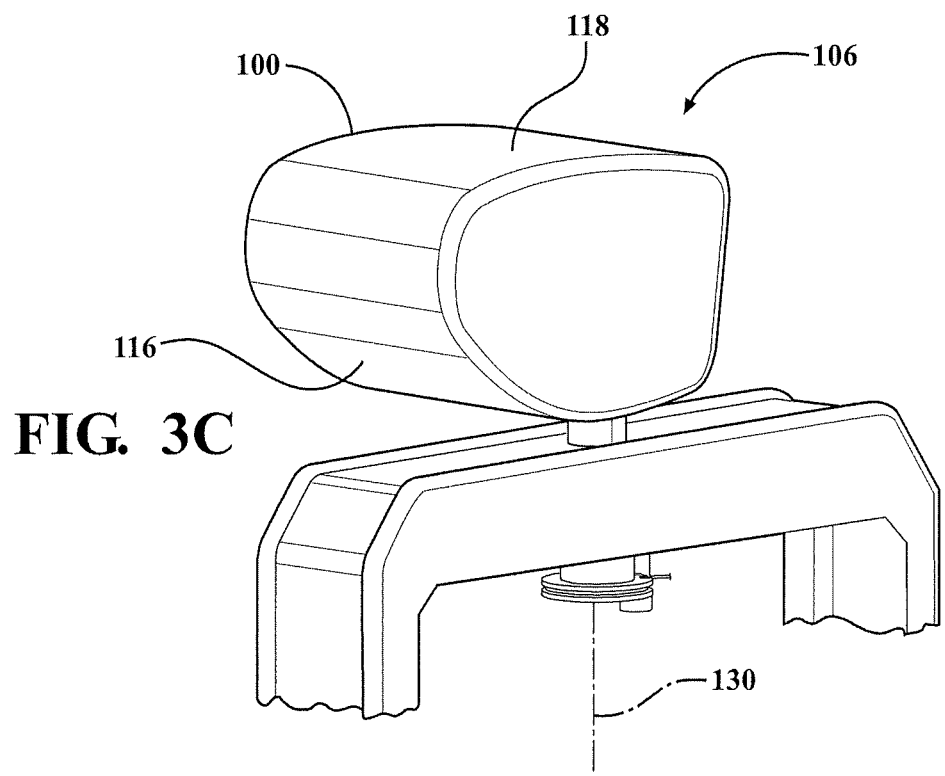
FIG. 3C illustrates a side perspective view of a head restraint in a fold flat position according to one embodiment of the present invention.

Referring to FIG. 3C, as the head restraint 100 rotates about 90 degrees from the forward-facing position 102 about the H/R rotational axis 130, the head restraint 100 pivots to the fold flat position 106 about the H/R folding axis 134. The fold flat position 106 may generally be about a 90 degree rotation about the H/R folding axis 134; however, any incline angle suitable for an intended application may be used. Likewise, the fold flat position 106 may generally be about 90 degree rotation about the H/R rotational axis 130; however, any angle of rotation suitable for an intended application may be used. In general, the fold flat position 106 aligns with a mid-point of the seat back 120 moving between the forward- and rearward-facing positions.

As the head restraint 100 rotates away from the fold flat position 106 towards the second transition position 108 shown in FIG. 3D, the head restraint 100 pivots upward about the H/R folding axis 134. The second transition position 108 may be about 135 degree rotation of the head restraint 100 about the H/R rotational axis 130 and about 45 degree rotation about the H/R folding axis 134. However, any angles of rotation about the H/R rotational axis 130 and about the H/R folding axis 134 suitable for an intended application may be used.

As the head restraint 100 rotates away from the second transition position 108 towards the rearward-facing design position 110 shown in FIG. 3E, the head restraint 100 pivots about the H/R folding axis 134 to the full upright position 110 as well as rotating about the H/R rotational axis 130 to the rearward-facing position 110. The rearward-facing design position 110 may be about 180 degree rotation of the head restraint 100 about the H/R rotational axis 130.

Figure 4:
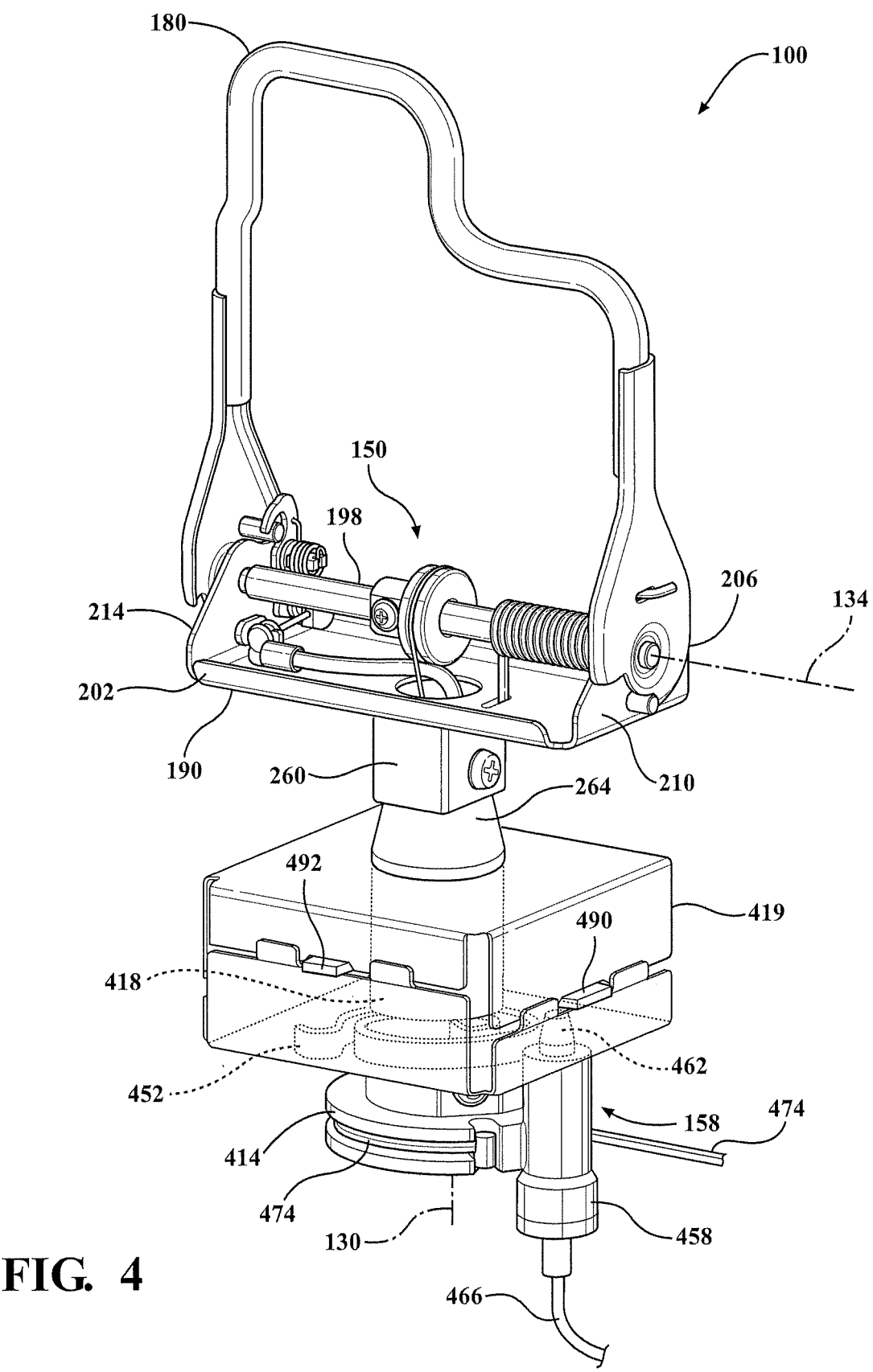
FIG. 4 illustrates a perspective view of a head restraint and head restraint rotational mechanism partially shown in phantom in an upright position according to one embodiment of the present invention.

FIG. 4 illustrates a perspective view of the head restraint 100 in an upright position 102 (shown in FIG. 3A), according to one embodiment of the present invention. FIG. 4 shows the head restraint folding mechanism 150 and the rotating mechanism 158, the functions and components of which are discussed below. The head restraint 100 comprises a generally U-shaped frame 180, a base bracket 190, a generally horizontal folding shaft 198, and the folding mechanism 150. The head restraint 100 is operatively coupled with the rotating mechanism 158. The head restraint 100 comprises a front surface 202, a rear surface 206, and opposing side surfaces 210, 214.

Figure 5:
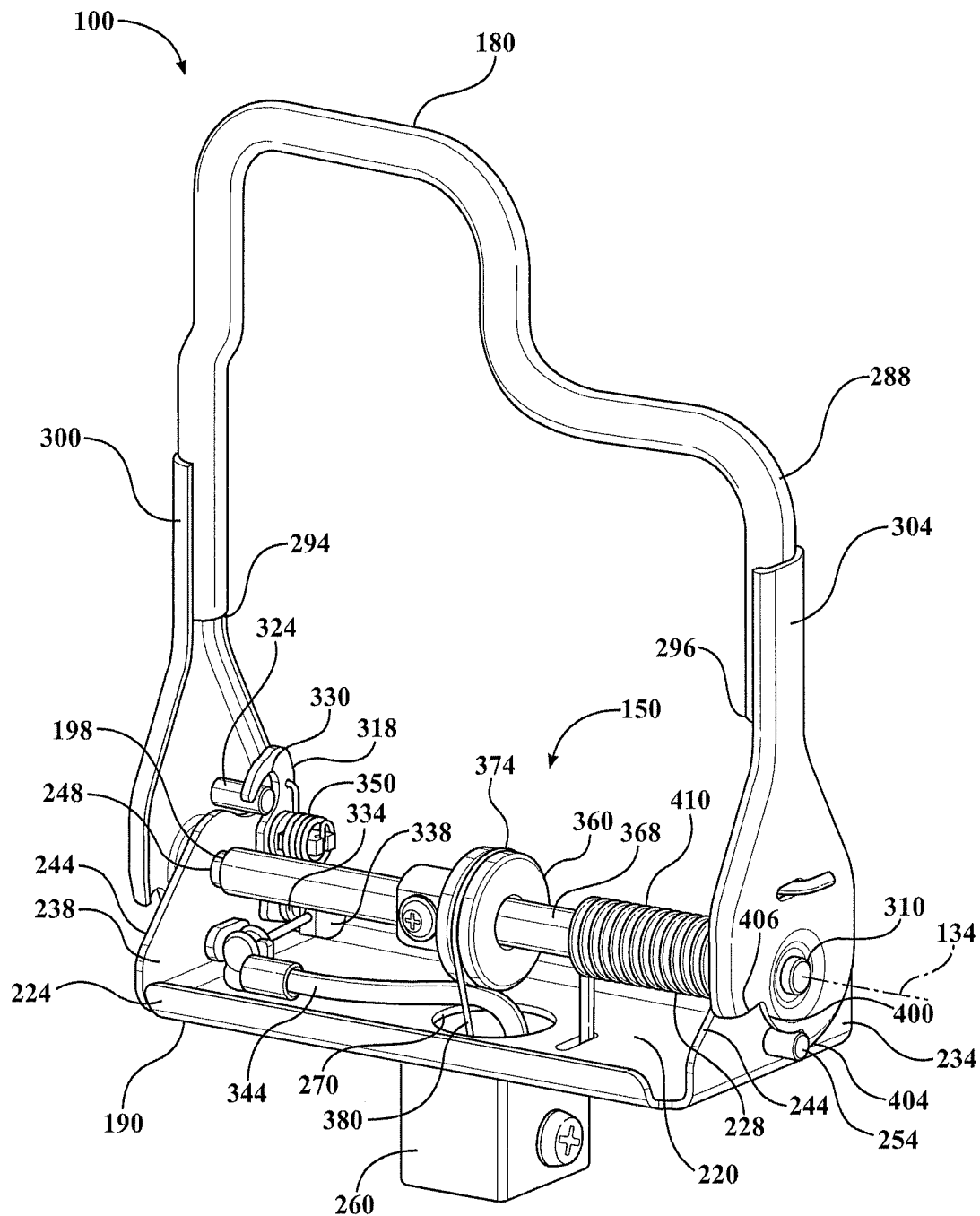
FIG. 5 illustrates a front perspective view of the head restraint of FIG. 4 according to one embodiment of the present invention.

FIG. 5 illustrates a front perspective view of the head restraint 100 including the folding mechanism 150 with the head restraint 100 in an upright position 102, 110. The base bracket 190 may have a generally rectangular shape with a generally flat central region 220, opposing front and rear walls 224, 228, and opposing end walls 234, 238. The base bracket 190 may have a triangular-shaped tab 244 extending from each end wall 234, 238 of the base bracket 190. Each triangular shaped tab may have a through hole 248 orientated in a longitudinal direction of the base bracket 190 and a stop pin 254 projecting from an outer surface of each end wall 234, 238. The folding shaft 198 may be rotationally coupled with the through hole 248 in each triangular-shaped tab 244 with each end of the shaft 198 extending through the triangular shaped tab 244. The head restraint folding axis 134 aligns with the longitudinal axis of the shaft 198. The base bracket 190 may have a connector member 260 which is fixedly coupled with an upper end of a H/R stay tube 264 (see FIG. 4). The stay tube 264 is discussed below. The base bracket 190 further comprises a central passageway 270 extending through the base bracket 190, through the connector member 260, and generally aligning with a passageway 280 in the stay tube 264 (shown in FIG. 7).

Referring to FIG. 5, the generally U-shaped frame 180 comprises a generally U-shaped tubular member 288 having a first and a second end 294, 296. Each end 294, 296 of the tubular member 288 is fixedly coupled with a respective lower pivot bracket 300, 304. Each end 310 of the folding shaft 198 may be fixedly coupled with a respective one of the lower pivot brackets 300, 304. A fastener may fixedly couple each lower pivot bracket 300, 304 to the respective end of the folding shaft 198. As assembled, the U-shaped frame 180 rotates with the folding shaft 198 with respect to the base bracket 190 about the H/R folding axis 134 between an upright position 102, 110 and a folded position 106.

A H/R folding lock 318 is shown in FIG. 5 rotatably coupled with the base bracket 190 and releasably engages with a locking pin 324 projecting from an inner surface of one of the lower pivot brackets 300, 304. The folding lock 318 comprises a locking hook 330 which releasably engages with the locking pin 324 when the U-shaped frame 180 is in the upright position 102, 110. A tail end 334 of the folding lock 318 is fixedly coupled with one end 338 of a H/R folding lock release cable 344. The folding lock release cable 344 will be described further below. When tension is applied to the folding lock release cable 344, the end 338 of the folding lock release cable 344 rotates the locking hook 330 of the folding lock 318 away from the locking pin 324 into an unlocked position which unlocks the U-shaped frame 180. The U-shaped frame 180 may rotate about the folding axis 134 with respect to the base bracket 190 when the U-shaped frame 180 is unlocked. When tension is removed from the folding lock release cable 344, the end 338 of the folding lock release cable 344 and the locking hook 330 are biased towards a locked position by a lock return spring 350. The folding lock 318 may rotate to a locked position and engage with the locking pin 324 when the U-shaped frame 180 returns to the upright position 102, 110.

As illustrated in FIG. 5, the folding mechanism 150 comprises a head restraint folding pulley 360 fixedly coupled with the folding shaft 198. When the folding pulley 360 is rotated towards a folded position, the shaft 198 rotates the head restraint 100 (i.e. the U-shaped frame 180) towards the folded position 106 (shown in FIG. 14). When the folding pulley 360 is rotated towards an upright position, the shaft 198 rotates the head restraint 100 towards the upright position 102, 110 (also shown in FIG. 5).

The H/R folding pulley 360 may be fixedly coupled with the folding shaft 198 with a rotational centerline of the folding pulley 360 aligned with the longitudinal axis 134 of the shaft 198. As shown in FIG. 5, the folding pulley 360 is fixedly coupled with a shaft cover 368 and with the folding shaft 198. One end 374 of a H/R folding cable 380 may be fixedly coupled with the folding pulley 360. A second end 386 of the folding cable 380 may be fixedly coupled with a H/R folding pin subassembly 394 (shown in FIG. 6) which will be discussed below. When tension is applied to the folding cable 380, the folding cable 380 applies tension to the folding pulley 360 causing the folding pulley 360 to rotate if the folding lock 318 has been moved to the unlocked position. When the folding lock 318 is in the unlocked position, rotation of the folding pulley 360 rotates the folding shaft 198 which rotates the U-shaped frame 180 away from the upright position 102, 110 and towards the fold flat position 106 (also shown in FIG. 14).

Referring to FIG. 5, each lower pivot bracket 300, 304 comprises a circumferential notch 400 along an outer periphery of a lower portion of the lower pivot bracket 300, 304. When the U-shaped frame 180 is assembled with the base bracket 190 and the folding shaft 198, each stop pin 254 is aligned within the notch 400 on the respective lower pivot bracket 300, 304. Each stop pin 254 releasably engages with one end 404 of the respective notch 400 when the U-shaped frame 180 is in the upright position 102, 110 (shown in FIG. 5) and releasably engages with the opposing end 406 of the respective notch 400 when the U-shaped frame 180 is in the folded position 106 (shown in FIG. 14).

A head restraint return spring 410 (shown in FIG. 5) may be operatively coupled between the base bracket 190 and one of the lower pivot brackets 300, 304 to urge the U-shaped frame 180 into the upright position 102, 110 with the notch 400 of each lower pivot bracket 300, 304 releasably engaged with the respective stop pin 254. The folding shaft 198 may pass through a longitudinal axis of the head restraint return spring 410. When tension is removed or reduced in the folding cable 380, the return spring 410 urges the U-shaped frame 180 towards the upright position 102, 110 which rotates the folding shaft 198 and the folding pulley 360 towards an upright position.

Referring to FIG. 4, the rotating mechanism 158 comprises a head restraint rotational pulley 414 fixedly coupled to a lower end 418 of the stay tube 264 with the rotational axis 130 of the rotational pulley 414 generally aligned with the longitudinal axis of the stay tube 264. The stay tube 264 is rotated by the movement of the rotational pulley 414. Rotation of the stay tube 264 rotates the head restraint 100 about the rotational axis 130. As shown in FIG. 4, the stay tube 264 passes through a clam shell box 419.

Figure 6:
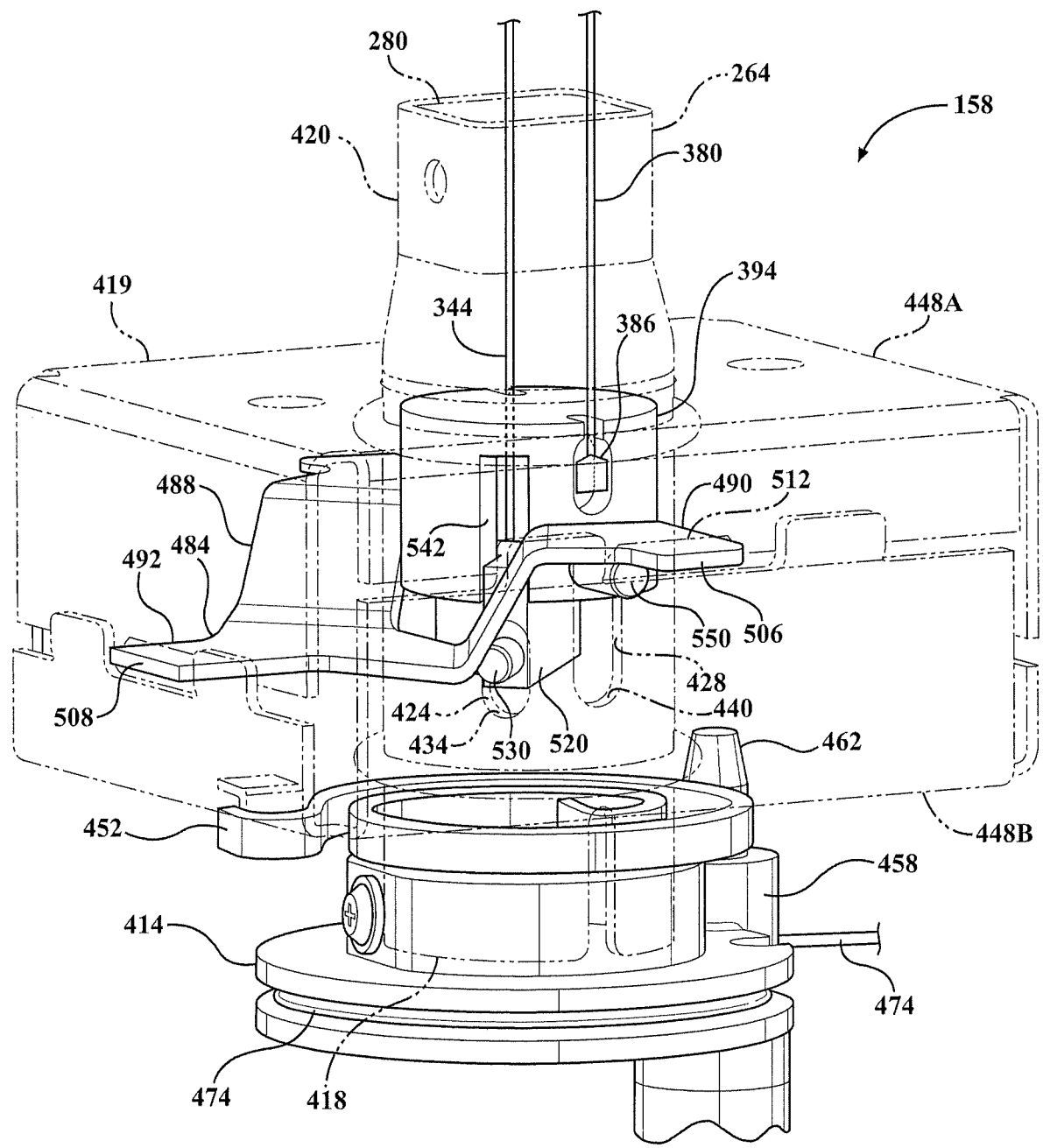
FIG. 6 illustrates a partial phantom view of the rotating mechanism of FIG. 4 with the head restraint in the full upright position and in the forward-facing design position shown in FIG. 3A according to one embodiment of the present invention.
Figure 7:
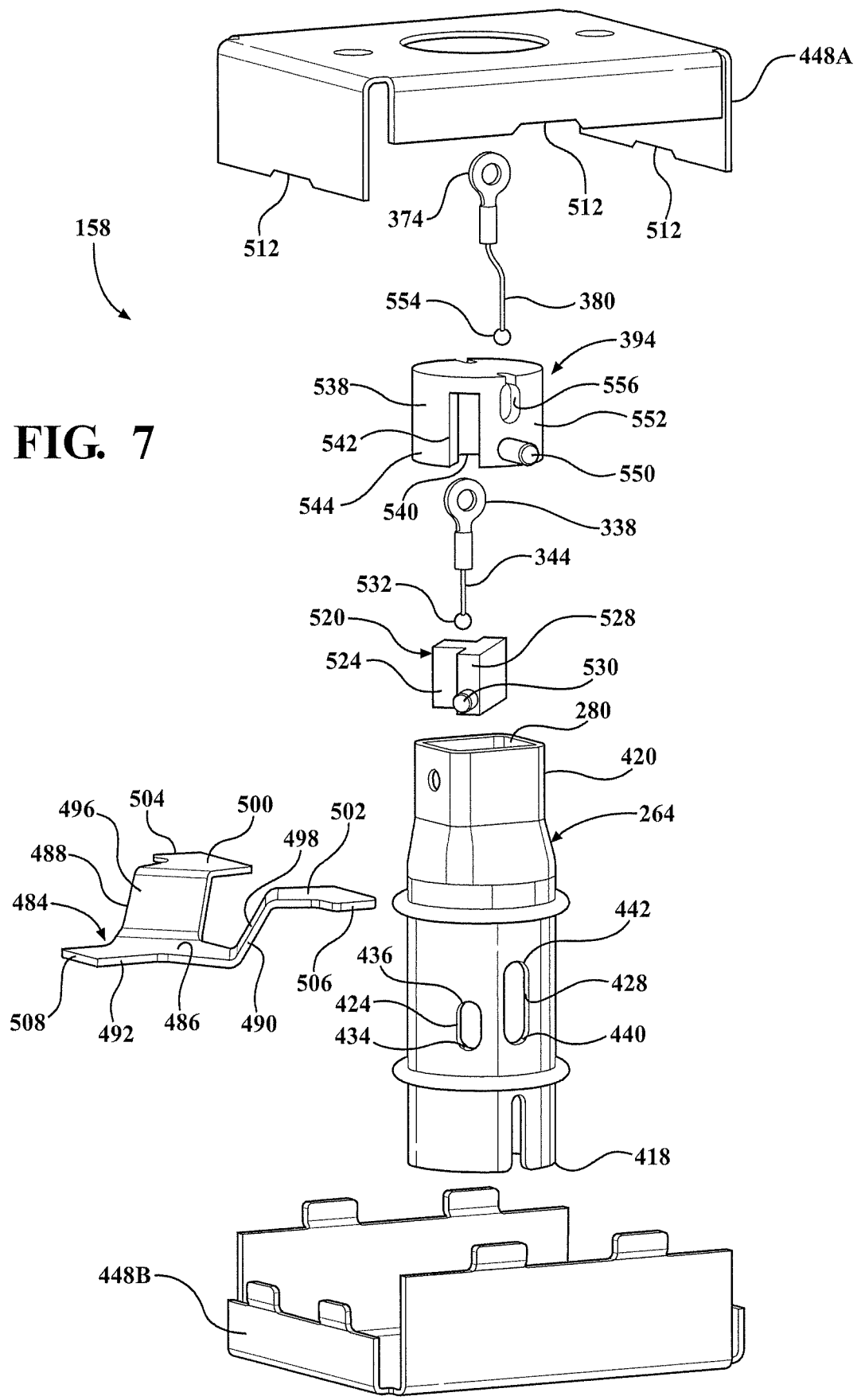
FIG. 7 illustrates an exploded view of an upper portion of the rotating mechanism of FIG. 6 according to one embodiment of the present invention.

FIG. 6 is a partial phantom view of the rotating mechanism 158 with the head restraint 100 in the full upright position and in the forward-facing design position 102 as shown in FIG. 3A. The clam shell box 419 and the stay tube 264 are shown with hidden lines in FIG. 6. FIG. 7 illustrates an exploded view of an upper portion of the rotating mechanism 158 showing components positioned within the clam shell box 419 of FIG. 6. The stay tube 264 has a generally cylindrical shape with the passageway 280 passing through the longitudinal axis of the stay tube 264. When assembled as part of the rotating mechanism 158, the H/R rotational axis 130 aligns with the longitudinal axis of the stay tube 264. The stay tube 264 comprises a generally cylindrical hollow body and may taper down to a generally square tubular end portion 420. The stay tube 264 further comprises a generally vertical folding lock release pin travel slot 424 and a generally vertical H/R folding pin travel slot 428. Other size, shape, and orientation of slots may be suitable for specific applications. A lower end 434 and an upper end 436 of the folding lock release pin travel slot 424 correspond to the unlocked position and the locked position, respectively, of the folding lock 318. A lower end 440 and an upper end 442 of the folding pin travel slot 428 correspond to the folded position 106 and the upright position 102, 110, respectively, of the head restraint 100.

The stay tube 264 passes through the clam shell box 419 (shown in FIG. 4) which comprises an upper clam shell bracket 448A coupled with a lower clam shell bracket 448B. As shown in FIG. 6, the lower end 418 of the stay tube 264 may extend below the lower clam shell bracket 448B and may be fixedly connected with the H/R rotational pulley 414 such that a longitudinal axis of the stay tube 264 aligns with a rotational axis of the rotational pulley 414. A H/R rotational return spring 452 is operatively coupled between the rotational pulley 414 and the lower clam shell bracket 448B and aligned with the rotational axis 130.

A head restraint rotational lock 458 is releasably coupled between the rotational pulley 414 and the lower clam shell bracket 448B. The rotational lock 458 comprises a rotational lock pin 462 which is operatively coupled with a rotational lock release cable 466 (shown in FIG. 4). When an actuation strap/handle (not shown) is pulled to release the reversible seat, the rotational lock release cable 466 pulls the rotational lock pin 462 out of a through hole 470 in the lower clam shell bracket 448B which unlocks the rotational pulley 414 (see FIG. 11).

As shown in FIG. 6, the rotational pulley 414 is operatively connected to a head restraint reversing cable 474 which is pulled by articulation of seat reversing links (not shown) to drive the rotation of the rotational pulley 414 and the attached stay tube 264.

A generally C-shaped lock release/dump plate 484 is positioned between the upper and lower clam shell brackets 448A, 448B as shown in FIG. 6. As best shown in FIG. 7, the lock release/dump plate 484 comprises a central horizontal portion 486 and three legs 488, 490, 492 projecting from the central portion 486. Each of the first and second legs 488, 490 has an inclined ramp portion 496, 498 having a first end connected the central horizontal portion 486 and a generally horizontal portion 500, 502 connected to a second end of the respective inclined ramp portion 496, 498. The first leg 488, central portion 486, and second leg 490 form a generally arcuate-shape which is positioned around a circumferential portion of the stay tube 264 (see FIG. 6). A distal end 504, 506, 508 of each of the three legs is positioned in notches 512 in the upper clam shell bracket 448A and retained in position when the upper and lower clam shell brackets 448A, 448B are assembled together. The distal end 504, 506, 508 of each of the three legs 488, 490, 492 may be sized and positioned to fit within the respective notch in the upper clam shell bracket 448A.

Also referring to FIGS. 6 and 7, positioned within the stay tube 264 is a folding lock release pin subassembly 520 and the H/R folding pin subassembly 394. Movement of the folding lock release pin subassembly 520 repositions the folding lock release cable 344 which moves the head restraint folding lock 318 between the unlocked and locked positions. Movement of the folding pin subassembly 394 repositions the folding cable 380 which moves the head restraint 100 between the folded position 106 and the upright position 102, 110.

The folding lock release pin subassembly 520 shown in FIG. 7 comprises a main body 524 have a generally rectangular boss 528 with a folding lock release pin 530 projecting outward from the rectangular boss 528. The H/R folding lock release cable 344 is fixedly coupled at one end 532 to the main body 524 of the folding lock release pin subassembly 520. The second end 338 of the folding lock release cable 344 is fixedly coupled with the H/R folding lock 318.

Also shown in FIG. 7, the folding pin subassembly 394 comprises a cylindrical main body 538 having a bore 540 extending at least partially through a longitudinal direction of the main body 538. The main body 538 may have a generally rectangular slot 542 on a sidewall 544 oriented in the longitudinal direction of the main body 538. The folding pin subassembly 394 further comprises a folding pin 550 projecting outward from a sidewall 552 of the main body 538. The H/R folding cable 380 is fixedly coupled at one end 554 to a recess 556 in the main body 538 and fixedly coupled to the H/R folding pulley 360 at the second end 374.

Referring to FIG. 6, the folding lock release pin subassembly 520 is positioned within the folding pin subassembly 394 with the rectangular boss 528 of the folding lock release pin subassembly 520 aligning with the generally rectangular slot 542 in the folding pin subassembly 394. The folding lock release pin subassembly 520 and the folding pin subassembly 394 are assembled within the stay tube 264 such that the folding lock release pin 530 extends through the folding lock release pin travel slot 424 and the folding pin 550 extends through the folding pin travel slot 428. When assembled with the lock release/dump plate 484 within the clam shell box 419, the folding lock release pin 530 and the folding pin 550 releasably engage with a lower surface of the lock release/dump plate 484. The vertical position of each pin 530, 550 within the respective pin travel slot 424, 428 is determined by the rotational position of the stay tube 264 with respect to the lock release/dump plate 484 and where each pin 530, 550 engages with the lock release/dump plate 484. FIG. 6 illustrates the positions of the folding lock release pin 530 and the folding pin 550 when the head restraint is in an upright position 102, 110. As shown, the folding lock release pin 530 engages a lower portion of the inclined ramp 498 of the second leg 490 of the lock release/dump plate 484. In this position, the folding lock release pin 530 is positioned at the upper end 436 of the folding pin travel slot 424 which places the folding lock release cable 344 in a locked position. Likewise, the folding pin 550 engages a lower surface of the generally horizontal tab 506 of the second leg 490 of the lock release/dump plate 484. In this position, the folding pin 550 is positioned at the upper end 442 of the folding pin travel slot 428 which places the folding cable 380 in the upright position.

Figure 13:
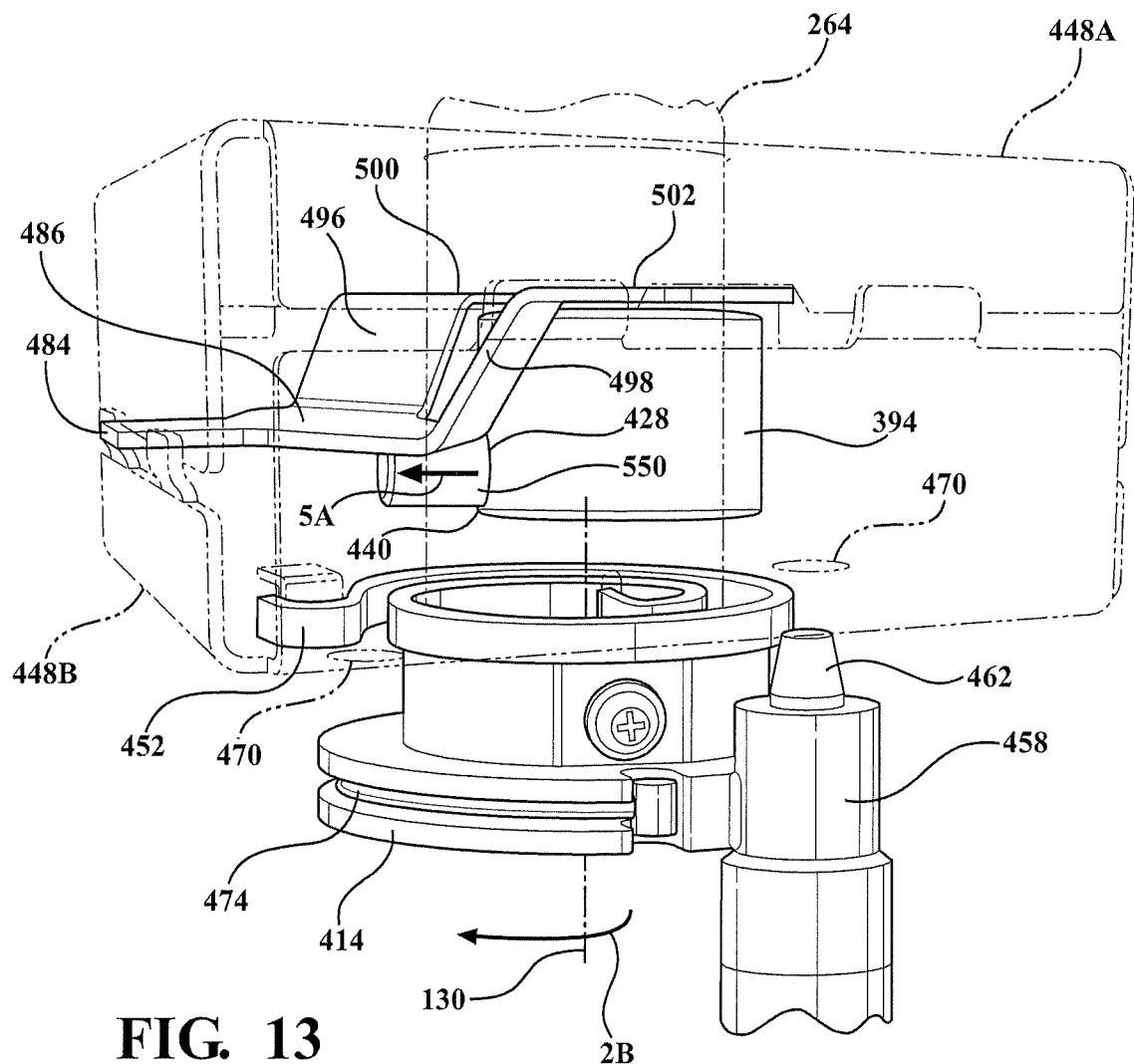
FIG. 13 illustrates a partial phantom view of the rotating mechanism of FIG. 4 with the head restraint in the fold flat position shown in FIG. 3C according to one embodiment of the present invention.
Figure 14:
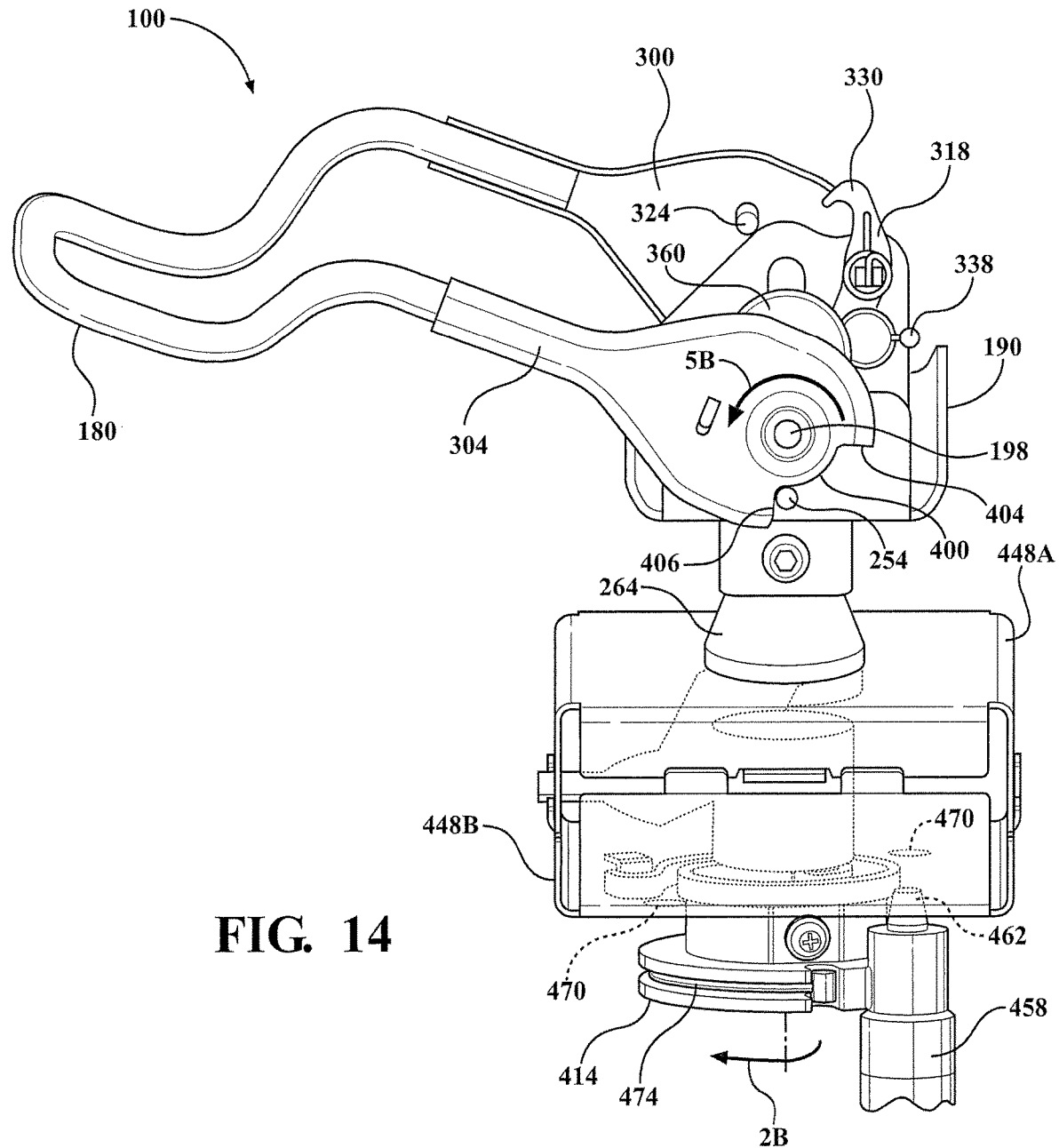
FIG. 14 illustrates the head restraint and rotating mechanism of FIG. 4 in the fold flat position shown in FIG. 3C according to one embodiment of the present invention.
Figure 15:
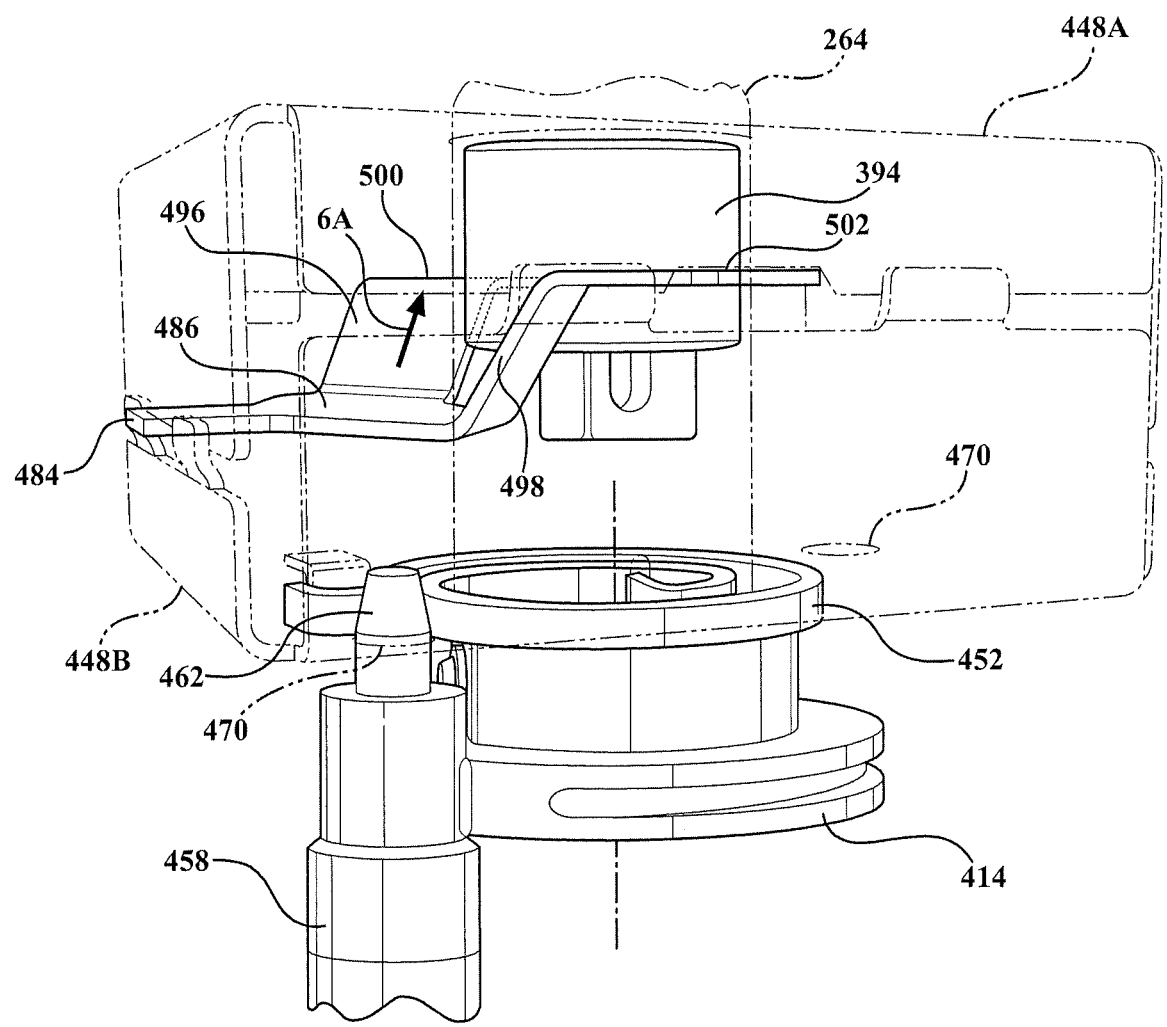
FIG. 15 illustrates a partially phantom view of the rotating mechanism of FIG. 4 with the head restraint in the rearward-facing upright position shown in FIG. 3E according to one embodiment of the present invention.
Figure 16:
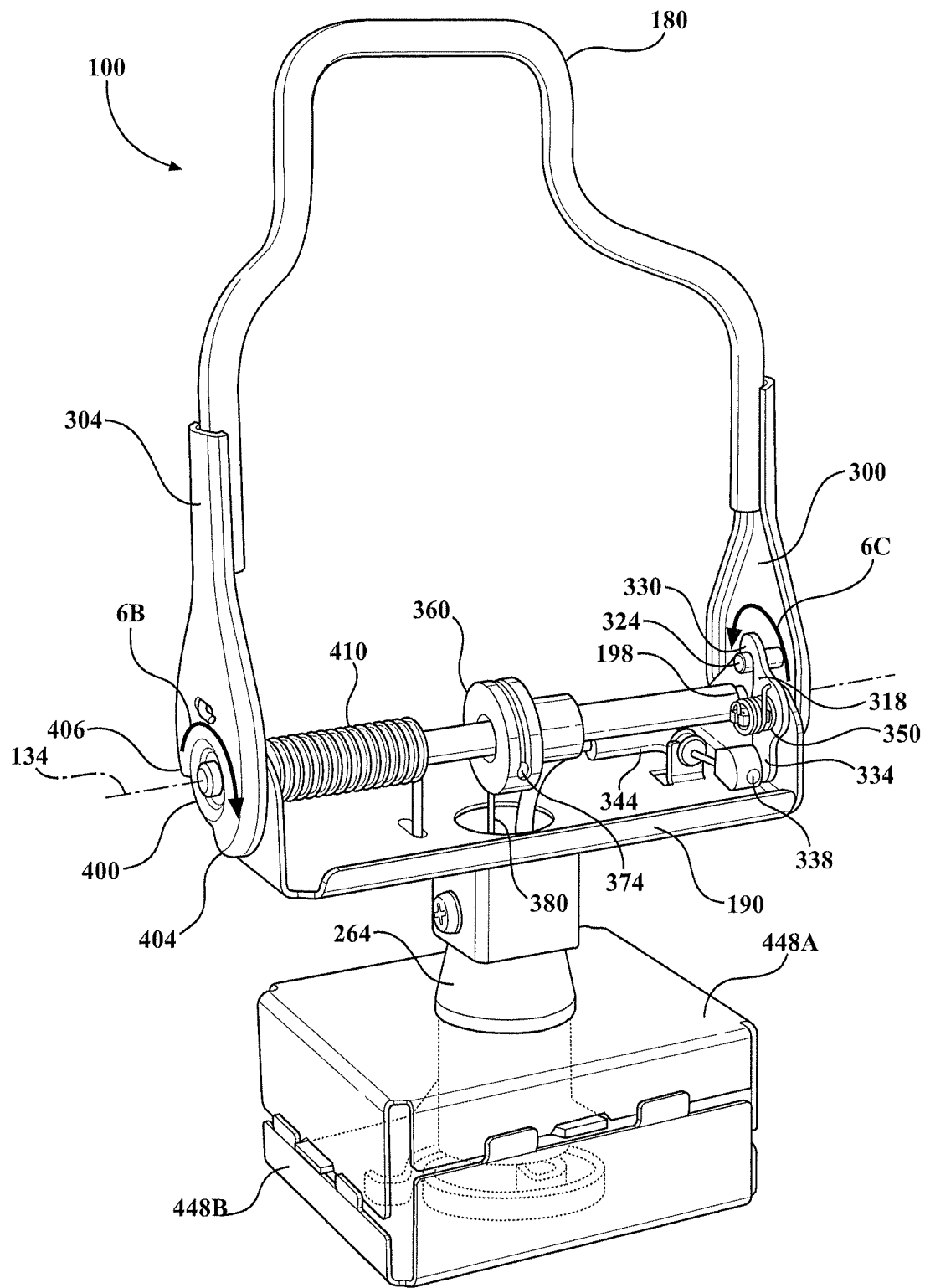
FIG. 16 illustrates the head restraint and rotating mechanism of FIG. 4 in the rearward-facing upright position shown in FIG. 3E according to one embodiment of the present invention.

FIGS. 8 through 16 illustrate the positions of the head restraint 100, the rotating mechanism 158, and the folding mechanism 150 as the reversible seat 10 moves between the forward-facing and the rearward-facing positions. For simplicity, the movement of the seat back and connected linkages are not shown as the seat is reversed. As described, the head restraint 100 is repositioned from the forward-facing upright position 102 (FIGS. 3A, 8, 9, and 10), through the first transition position 104 (FIGS. 3B, 11, and 12), to the fold down position 106 (FIGS. 3C, 13, and 14), through the second transition position 108 (FIG. 3D, and similar to FIGS. 11 and 12), and ending at the rearward-facing upright position 110 (FIGS. 3E, 15, and 16). The motions of the head restraint 100 are controlled by the folding mechanism 150 and the rotating mechanism 158, which in turn are driven by a head restraint reversing cable 474 connected to reversible seat links (not shown).

The motion of rotating and folding of the head restraint 100 is described by the following steps, which will be discussed in more detail with respect to the Figures below.

Step 1: Actuation strap/handle (not shown) is pulled to release the reversible seat 10, which also pulls the rotational lock release cable 466 (1A), which releases the rotational lock pin 462 (1B). See FIG. 8.

Step 2: As seat back 14 is moved from the forward-facing position 18A to the rearward-facing position 18B, motion of the seat reversing links 48 relative to another fixed component pulls the head restraint reversing cable 474 (2A) to drive rotation of the head restraint stay tube 264 (2B). See FIGS. 8 and 9.

Step 3: Initial rotation of the head restraint 100 will force the folding lock release pin 530 against the ramp 498 of the lock release/dump plate 484 (3A). The folding lock release pin 530 will pull the folding lock release cable 344 (3B) and release the head restraint lock 318 (3C). See FIGS. 9 and 10.

Step 4: Further rotation of head restraint 100 will force folding pin 550 against the ramp 498 of the lock release/dump plate 484 (4A). The folding pin 550 will pull folding cable 380 (4B) and begin to fold the head restraint 100 (4C). See FIGS. 11 and 12.

Step 5: At the bottom of central portion 486 (5A) of the lock release/dump plate 484, the head restraint 100 will be held in its fold flat position (5B) as the reversible seat passes through the peak of its locus. See FIGS. 13 and 14.

Step 6: As the seat approaches the reversed position, the folding pin 550 will travel up the lock release/dump plate 484 (6A) as the head restraint 100 returns upright via the return spring 410 (6B). The folding lock 318 will reengage (6C) as the head restraint 100 returns to the upright position. See FIGS. 15 and 16.

Figure 8:
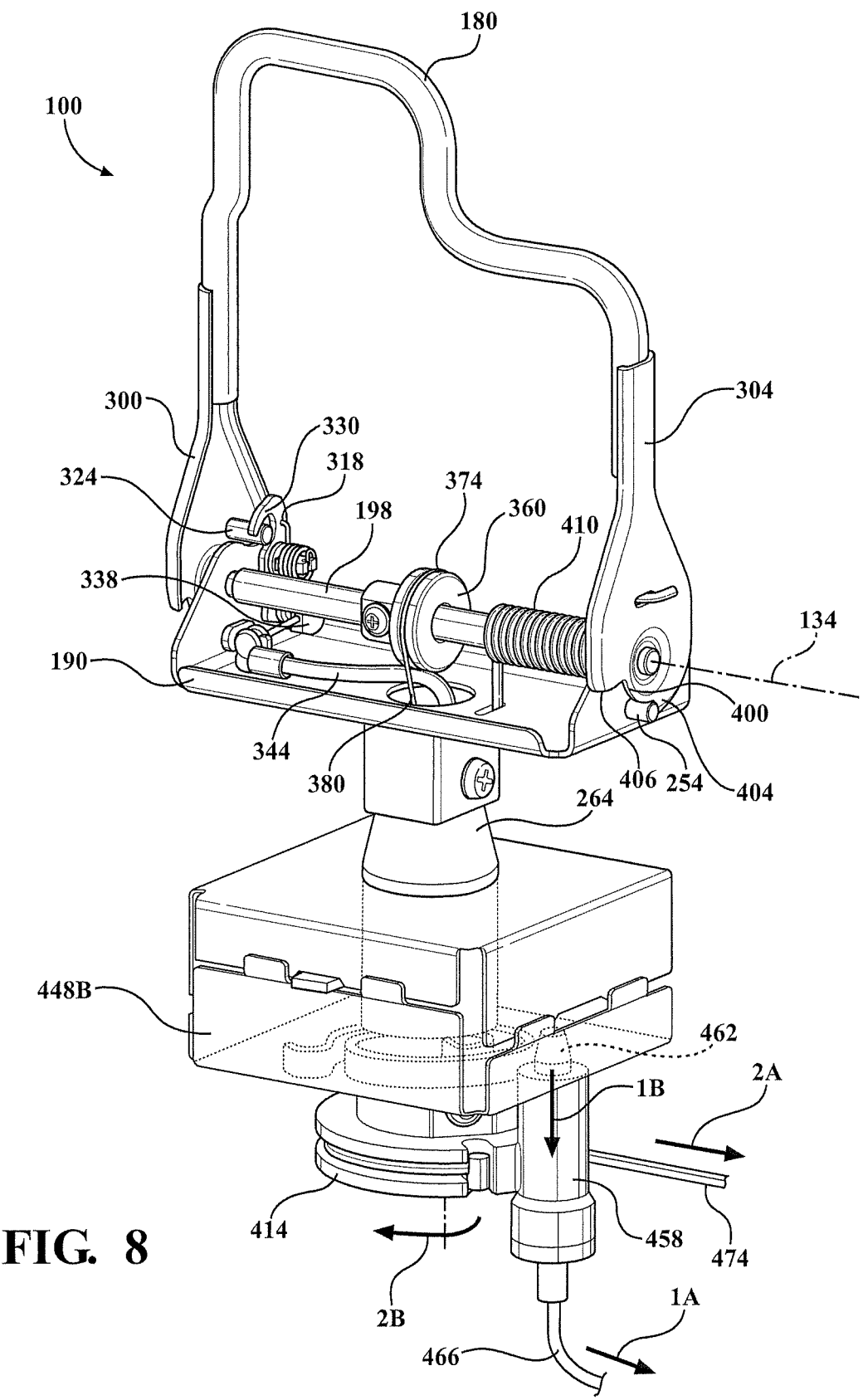
FIG. 8 illustrates the head restraint and rotating mechanism of FIG. 4 in the forward-facing upright position according to one embodiment of the present invention.

FIG. 8 illustrates the positions of the head restraint components when the head restraint 100 is in the forward-facing upright position 102. The U-shaped frame 180 is in the upright position with the locked position end 404 of the notch 400 in the lower brackets 300, 304 releasably engaged with the stop pin 254. The locking hook 330 is releasably engaged with the locking pin 324 on the lower bracket 300. The rotational lock pin 462 is releasably engaged with one of the rotational lock through holes 470. The rotational lock pin 462 prevents the head restraint from rotating while the rotational lock pin 462 is engaged with the rotational lock through hole 470. The locking hook 330 engaged with the locking pin 324 prevents the head restraint 100 from folding. In Step 1, the actuation strap/handle (not shown) is pulled to release the reversible seat 10, which also pulls the rotational lock release cable 466 (motion shown by arrow 1A), which releases the rotational lock pin 462 (motion shown by arrow 1B). In Step 2, articulation of seat reversing links pulls the head restraint reversing cable 474 (motion shown by arrow 2A) to drive rotation of the rotational pulley 414 which rotates the head restraint stay tube 264 (motion shown by arrow 2B).

Figure 9:
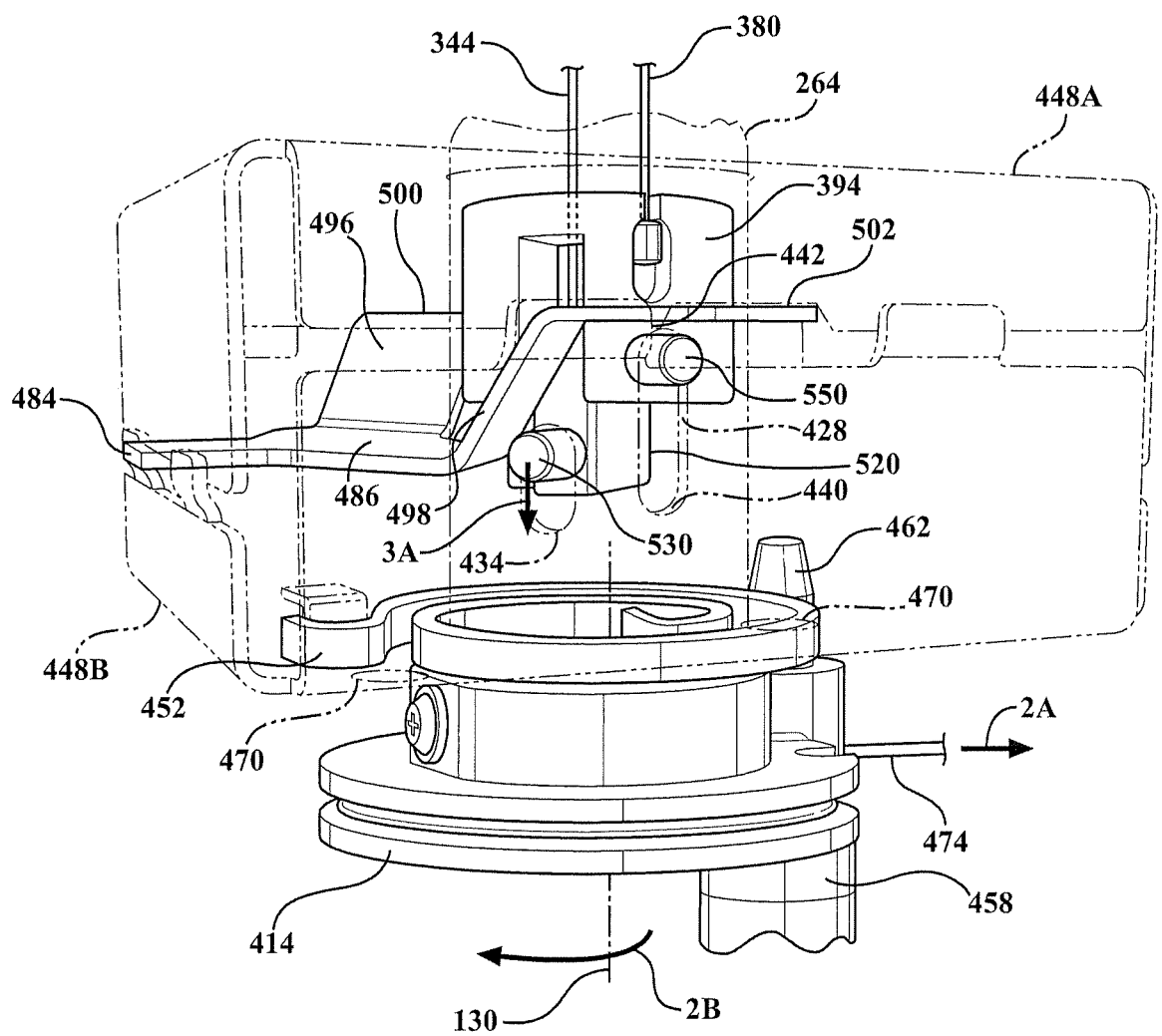
FIG. 9 illustrates a partial phantom view of the rotating mechanism of FIG. 4 with the head restraint in the full upright position and in the forward-facing design position shown in FIG. 3A according to one embodiment of the present invention.

FIG. 9 illustrates the positions of the folding lock release pin 530 and the folding pin 550 with respect to the lock release/dump plate 484 when the head restraint 100 is in the forward-facing upright position 102. In FIG. 9, the folding pin 550 is releasably engaged with a lower surface of the horizontal portion 502 of the second leg 490 of the lock release/dump plate 484. Also, the folding lock release pin 530 is releasably engaged with a lower surface of the inclined ramp 498 of the second leg 490 of the lock release/dump plate 484. See FIG. 7 for details of the lock release/dump plate 484. Step 2 is also shown in FIG. 9 with the motion of the head restraint reversing cable 474 (motion shown by arrow 2A) driving rotation of the head restraint stay tube 264 (motion shown by arrow 2B) by rotating the rotational pulley 414. In Step 3, FIG. 9 illustrates the initial rotation of the rotational pulley 414 forcing the folding lock release pin 530 against the ramp 498 of the lock release/dump plate 484 (motion shown by arrow 3A).

Figure 10:
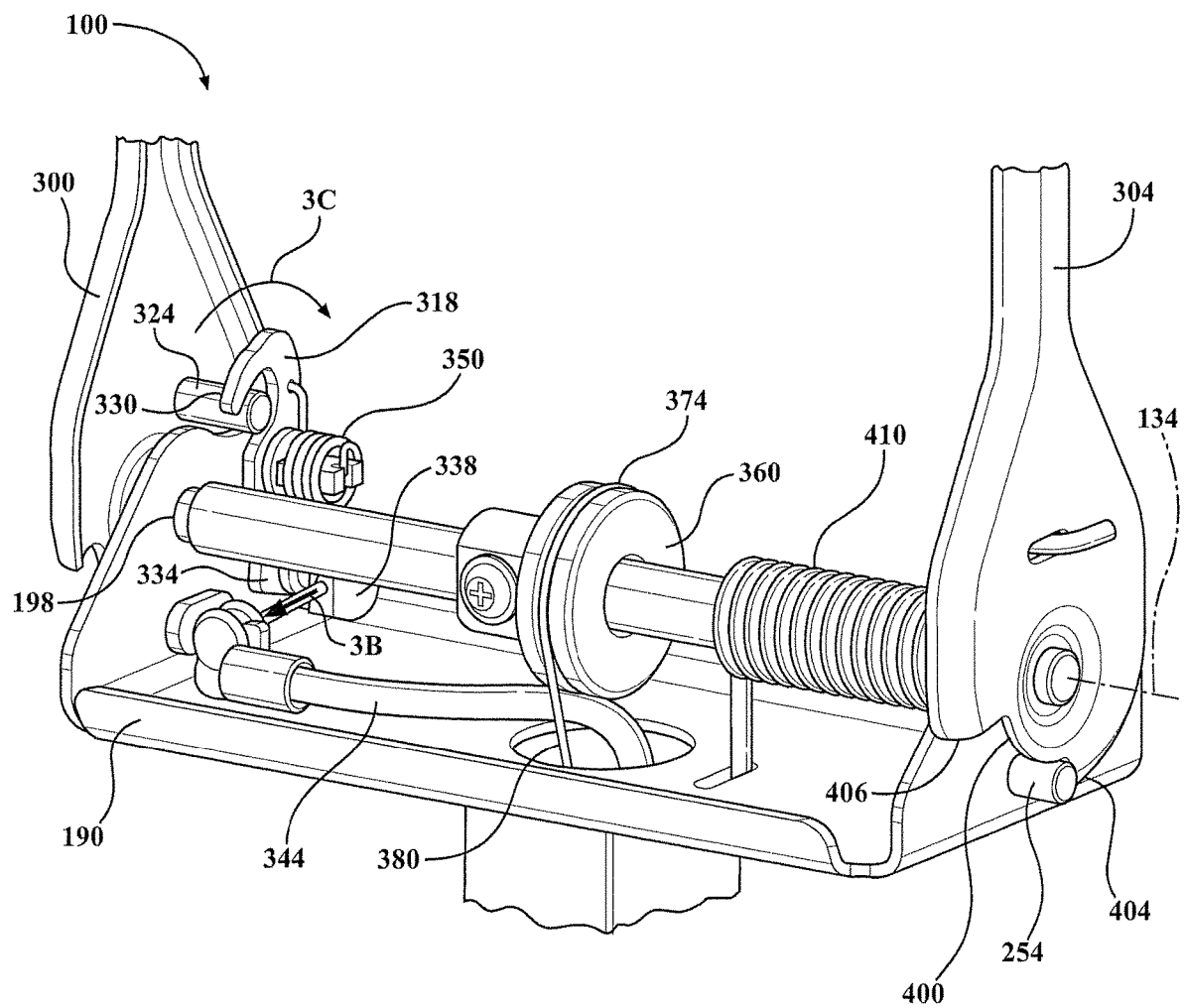
FIG. 10 illustrates the head restraint of FIG. 4 in the forward-facing upright position shown in FIG. 3A according to one embodiment of the present invention.

FIG. 10 illustrates the positions of the head restraint components when the head restraint 100 is in the forward-facing upright position 102 and during Step 3. In Step 3, FIG. 10 illustrates the initial rotation of the folding lock 318 (motion shown by arrow 3C) in response to the motion of the folding lock release cable 344 (motion shown by arrow 3B).

Figure 11:
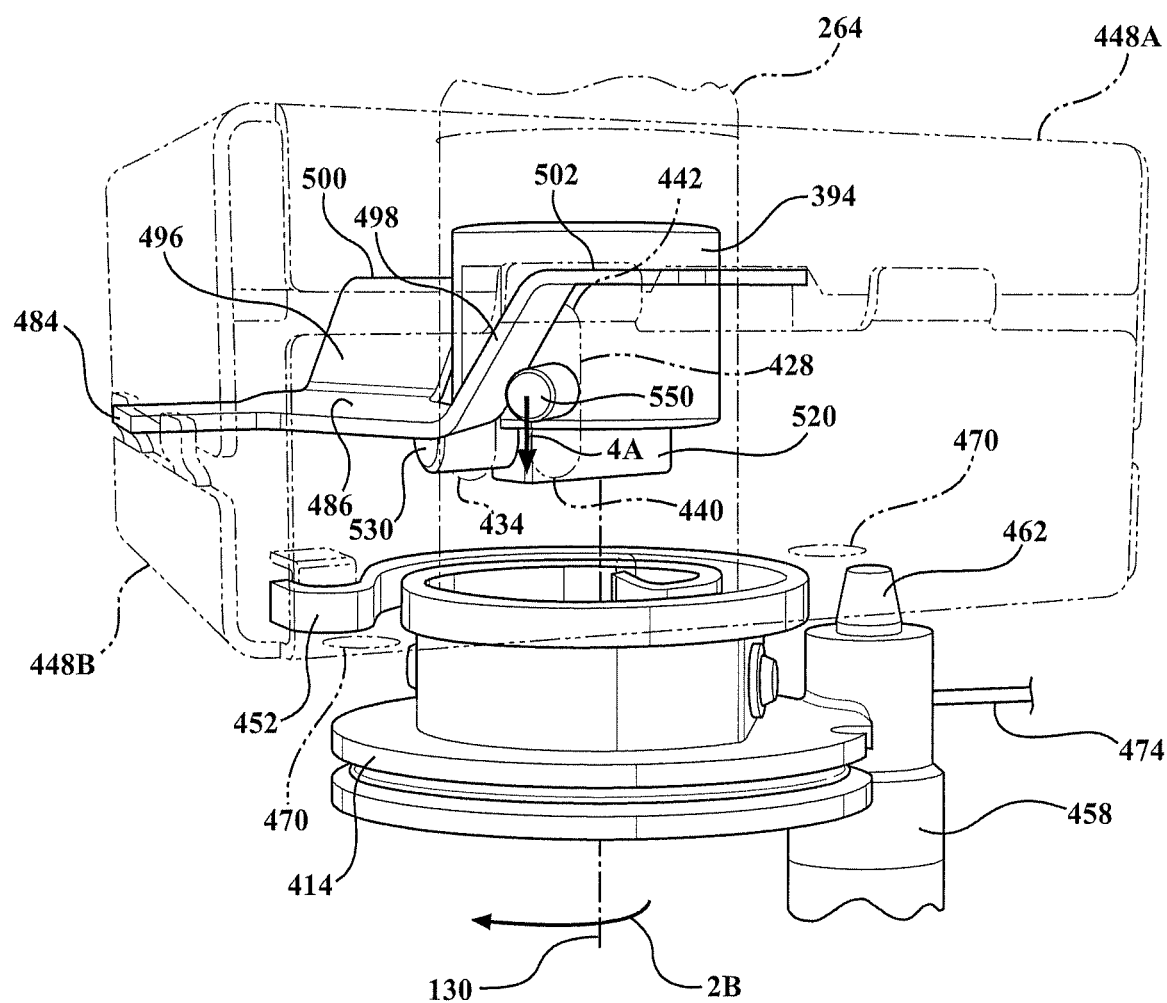
FIG. 11 illustrates a partial phantom view of the rotating mechanism of FIG. 4 with the head restraint in the first transition position shown in FIG. 3B according to one embodiment of the present invention.

FIG. 11 illustrates the positions of the folding lock release pin 530 and the folding pin 550 with respect to the lock release/dump plate 484 when the head restraint 100 is in the first transition position 104 and during Step 4. In Step 4, further rotation of rotational pulley 414 forces the folding pin 550 against the inclined ramp 498 of the first leg 488 of the lock release/dump plate 484 (motion shown by arrow 4A). As shown in FIG. 11, the rotational lock pin 462 has been released from the lock pin through hole 470, the folding lock release pin 530 has moved underneath the central portion 486 of the lock release/dump plate 484 which maintains the folding lock 318 in an unlocked position. The folding pin 550 moves lower in the stay tube 264 due to rotation of the stay tube 264 and the engagement between the folding pin 550 and the inclined ramp 498. Vertical movement of the folding pin 550 in the folding pin travel slot 428 will pull the folding cable 380 which will rotate the folding pulley 360 to rotate the head restraint 100 towards the folded position 106.

Figure 12:
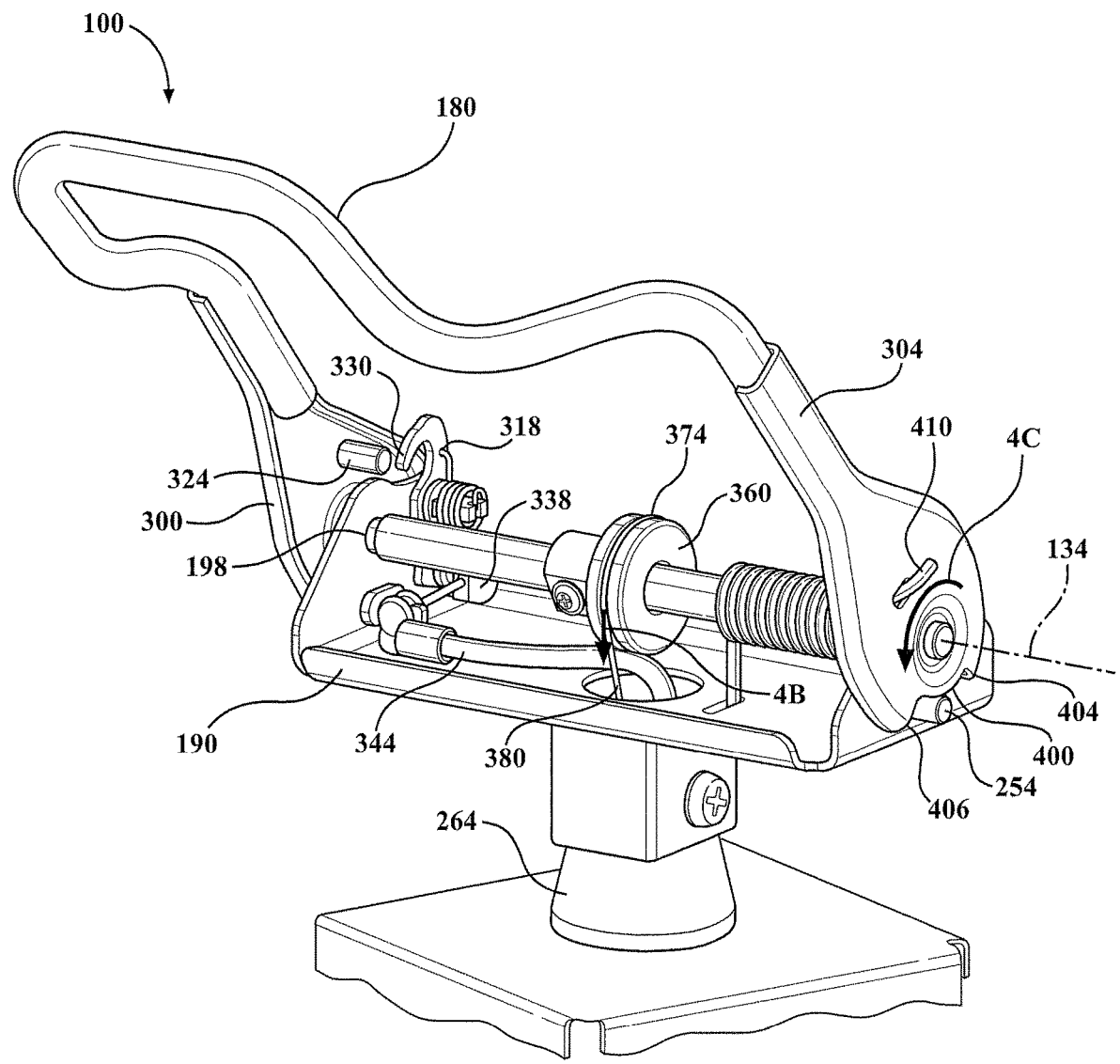
FIG. 12 illustrates the head restraint of FIG. 4 in the first transition position shown in FIG. 3B according to one embodiment of the present invention.

FIG. 12 illustrates the positions of the head restraint components when the head restraint 100 is in the first transition position 104 during Step 4 and as shown in FIG. 3B. As shown in FIG. 12, the folding pin 550 pulls the folding cable 380 (motion shown by arrow 4B) and will begin to fold the head restraint 100 (motion shown by arrow 4C). Also shown in FIG. 12, the stay tube 264 has partially rotated away from the forward-facing position, the folding lock 318 is in the unlocked position, and the lower brackets 300, 304 have rotated about the folding shaft 198 such that the folded end 406 of the notch 400 is approaching the stop pin 254 as the head restraint 100 rotates towards the folded position 106.

FIG. 13 illustrates the positions of the folding lock release pin 530 and the folding pin 550 with respect to the lock release/dump plate 484 when the head restraint 100 is in the folded position 106 and during Step 5. In Step 5, further rotation of rotational pulley 414 (and the stay tube 264) moves both the folding pin 550 and the folding lock release pin 530 underneath the central portion 486 of the lock release/dump plate 484 (motion shown by arrow 5A). As shown in FIG. 13, the rotational lock pin 462 has rotated to a midway point between the lock pin through holes 470. The folding lock release pin 530 has moved underneath the central portion 486 of the lock release/dump plate 484 which maintains the folding lock 318 in an unlocked position. The folding pin 550 moves lower in the stay tube 264 due to rotation of the stay tube 264 and the engagement between the folding pin 550 and the underside of the central portion 486 of the lock release/dump plate 484. Vertical movement of the folding pin 550 in the folding pin travel slot 428 to the folded position 440 will pull the folding cable 380 which will rotate the folding pulley 360 to rotate the head restraint 100 into the folded position 106 shown in FIG. 3C. When the folding pin 550 is at the bottom 486 of the lock release/dump plate 484, the head restraint 100 will be held in its fold flat position 106 as the reversible seat 10 passes through the peak of its locus.

FIG. 14 illustrates the positions of the head restraint components when the head restraint 100 is in the folded position 106 during Step 5 and as shown in FIG. 3C. As shown in FIG. 13, the folding pin 550 pulls the folding cable 380 (motion shown by arrow 4B) and folds the head restraint 100 (motion shown by arrow 5B in FIG. 14) to a folded position 106. Also shown in FIG. 14, the stay tube 264 has rotated away from the forward-facing position towards a midpoint between the forward-facing and rearward-facing positions, the folding lock 318 is in the unlocked position, and the lower brackets 300, 304 have rotated about the folding shaft 198 such that the folded end 406 of the notch 400 is releasably engaged with the stop pin 254 as the head restraint 100 is held in the folded position 106.

FIG. 15 illustrates the positions of the folding lock release pin 530 and the folding pin 550 with respect to the lock release/dump plate 484 when the head restraint 100 is in the rearward-facing upright position 110 and during Step 6.

In Step 6, further rotation of the rotational pulley 414 (and the stay tube 264) moves both the folding pin 550 and the folding lock release pin 530 up the inclined ramp 496 of the lock release/dump plate 484 (motion shown by arrow 6A). Not shown is the second transition position 108 between the folded position 106 and the rearward-facing upright position 110 which occurs during Step 6. The movement of the individual components as the head restraint moves from the folded position 106, through the second transition position 108, and to the rearward-facing upright position 110 is generally a mirror image of FIGS. 9-14 in a reverse order.

As the rotational pulley 414 rotates past the folded position, the folding lock release pin 530 will rise up the inclined ramp 496 of the lock release/dump plate 484 while the folding pin 550 is still positioned underneath the central portion 486 of the lock release/dump plate 484. The folding lock release pin 530 will be repositioned to the locked position at the upper end 436 of the folding lock release travel slot 424 (See FIG. 9). This releases the tension on the folding lock release cable 344 and the lock return spring 350 rotates the folding lock 318 towards a locked position (see FIG. 10). Since the head restraint 100 has not yet returned to an upright position, the folding lock 318 does not yet engage the locking pin 324.

As the rotational pulley 414 rotates further past the folded position, the folding pin 550 will travel up the inclined ramp 496 of the lock release/dump plate 484 to a position shown in FIG. 15. The folding pin 550 will move to the upper end 442 of the folding pin travel slot 428 which reduces the tension on the folding cable 380 (similar to FIG. 9).

FIG. 16 illustrates the positions of the head restraint components when the head restraint 100 is in the rearward-facing upright position 110 during Step 6 and as shown in FIG. 3E. As the tension is reduced on the folding cable 380, the head restraint return spring 410 rotates the folding pulley 360, the folding shaft 198, and the U-shaped frame 180 towards an upright position 110 (motion shown by arrow 6B). As the U-shaped frame 180 returns to the upright position 110, the locking hook 330 of the folding lock 318 releasably engages with the locking pin 324 which locks the head restraint 100 in an upright position 110 (motion shown by arrow 6C). The head restraint 100 reaches the rearward-facing upright position 110 (FIG. 3E) generally about when the reversible seat 10 reaches the rearward-facing upright position. When the actuation strap/handle (not shown) returns to a locked position with the seat 10 locked in the rearward-facing upright position, the tension on rotation lock release cable 466 decreases and the rotational lock pin 462 engages with the locking pin through hole 470 which locks the head restraint 100 and prevents rotation of the head restraint 100.

When the seat is in the rearward-facing upright position, the actuation strap/handle (not shown) is pulled to release the reversible seat, and the seat back is moved between the rearward-facing position and the forward-facing position, the head restraint is automatically rotated, folded flat, and then raised to the forward-facing upright position in a similar manner as described above.

One benefit of the head restraint mechanism for a reversible seat which rotates and folds flat during the seat back reversal is a head restraint which meets FMVSS 202A height requirements in both the forward-facing and rearward-facing positions. A second benefit is improved occupant comfort since a single side of the head restraint is orientated towards the occupant in both seating positions. An additional benefit is a head restraint which adjusts its position automatically based on the movement of the seat back between the two opposing positions. Also, the disclosed head restraint mechanism increases clearance with the headliner as the seat is reversed between opposing positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A reversible seat for an automotive vehicle having a forward-facing position and a rearward-facing position, said reversible seat comprising a seat cushion, a seat back, and a head restraint operatively coupled to said seat back by a shaft having a rotating mechanism, said head restraint having a forward-facing position and a rearward-facing position and a front surface and rear surface, wherein said front surface faces an occupant of said seat when said seat is in said forward-facing position and in said rearward-facing position;
wherein moving said seat back between one of said forward-facing and rearward-facing positions automatically actuates said rotating mechanism to rotate said head restraint about said shaft between said respective forward-facing position and said rearward-facing position with respect to a rotational axis extending longitudinally through said shaft; and
wherein said head restrain moves between an upright position and a folded position when said head restraint is rotated away from one of said forward-facing position and said rearward-facing position.

2. The reversible seat as set forth in claim 1, wherein said head restraint is in a forward-facing upright position when said reversible seat is in said forward-facing position, said head restraint is in a rearward-facing upright position when said reversible seat is in said rearward-facing position, and said head restraint is in said folded position when said seat is about midway between said forward-facing position and said rearward-facing position.

3. The reversible seat as set forth in claim 2, wherein said head restraint rotates about 180 degrees about a longitudinal axis of said shaft when said head restraint moves between said forward-facing position and said rearward-facing position.

4. The reversible seat as set forth in claim 3, wherein said head restraint is in said folded position when said head restraint has rotated about 90 degrees from one of said forward-facing and rearward-facing positions.

5. The reversible seat as set forth in claim 4, wherein said head restraint rotates about a folding axis when moving between said upright position and said folded position;
wherein said folding axis is generally orthogonal to said rotational axis.

6. A head restraint for an automotive seat comprising:
a head restraint frame rotatably coupled with a folding shaft about a first rotational axis extending through said folding shaft;
said head restraint frame rotatably coupled with a rotating stay tube about a second rotational axis extending longitudinally through said stay tube transverse to said first rotational axis;
wherein rotation of said stay tube automatically actuates rotation of said head restraint frame about said folding shaft.

7. The head restraint as set forth in claim 6, said head restraint comprising a rotating mechanism to rotate said stay tube about said second rotational axis.

8. The head restraint as set forth in claim 7, said rotating mechanism comprises a rotational pulley operatively coupled to a reversing cable;
wherein movement of said reversing cable rotates said rotational pulley about a head restraint rotational axis to rotate said head restraint about said second rotational axis.

9. The head restraint as set forth in claim 8, said rotating mechanism comprising a rotational lock having a locked position and an unlocked position;
wherein said rotational lock prevents rotation of said head restraint about said second rotational axis when said rotational lock is in said locked position.

10. The head restraint as set forth in claim 9, said rotational lock operatively coupled with a actuation release handle and/or strap;
wherein movement of said actuation release handle and/or strap to an unlocked position repositions said rotational lock into said respective unlocked position.

11. The head restraint as set forth in claim 10, said automotive seat comprising a seat back, a seat cushion, a seat frame, and reversing linkage operatively coupled between said seat back and said seat frame;
wherein said reversing linkage repositions said seat back between a forward-facing position and a rearward-facing position.

12. The head restraint as set forth in claim 11, wherein said reversing cable is operatively coupled to said reversing linkage such that movement of said reversing linkage repositions said reversing cable to rotate said rotational pulley.

13. The head restraint as set forth in claim 12, said head restraint comprising a folding mechanism to rotate said head restraint frame about said folding shaft.

14. The head restraint as set forth in claim 13, said folding mechanism comprising a folding pulley fixedly coupled to said folding shaft and operatively coupled to a folding cable.

15. The head restraint as set forth in claim 14, said folding cable operatively coupled with said rotating mechanism;
wherein movement of said rotating mechanism repositions said folding cable which rotates said folding pulley to rotate said head restraint frame about a longitudinal axis of said folding shaft.

16. The head restraint as set forth in claim 15, said folding mechanism comprising a folding lock operatively coupled with said head restraint frame; and said folding lock having a locked position and an unlocked position;

wherein said folding lock prevents rotation of said head restraint frame about said longitudinal axis of said folding shaft when said folding lock is in said locked position.

17. The head restraint as set forth in claim 16, wherein said folding lock is operatively coupled with a folding lock release cable;

said folding lock release cable being operatively coupled with said rotating mechanism;

wherein rotation of said rotating mechanism repositions said folding lock release cable which moves said folding lock to said unlocked position.

18. A method of reversing an automotive seat between one of a forward-facing position and a rearward-facing position, said method comprising:

providing a reversible seat having a rotatable and foldable head restraint wherein rotation of said head restraint and wherein said folding of said head restraint are automatically actuated by moving said reversible seat between said forward-facing and rearward-facing positions;

pulling an actuation strap and/or handle to release said reversible seat which also releases a rotational lock on said head restraint;

articulating seat reversing links which drives rotation of said head restraint about a head restraint rotational axis;

rotating said head restraint to a first rotational position with respect to said head restraint rotational axis releases said head restraint folding lock;

rotating said head restraint to a second rotational position with respect to said head restraint rotational axis folds said head restraint about a folding axis towards an upper portion of said seat;

rotating said head restraint to a third rotational position with respect to said head restraint rotational axis moves said head restraint to an upright position about said folding axis; and articulating said seat reversing links to one of said forward-facing and rearward-facing positions which locks said seat in said respective position, locks said head restraint in a rotational locked position, and locks said head restraint in an upright position.

\* \* \* \* \*